US009958301B2

United States Patent
Kirk et al.

(10) Patent No.: US 9,958,301 B2
(45) Date of Patent: May 1, 2018

(54) IMPACT MASS FLOW SENSOR FOR MONITORING PEANUT HARVEST YIELDS

(71) Applicants: Clemson University, Clemson, SC (US); Amadas Industries, Inc., Suffolk, VA (US)

(72) Inventors: Kendall R. Kirk, Pendleton, SC (US); J. Warren White, Suffolk, VA (US); W. Scott Monfort, Aiken, SC (US); Hunter F. Massey, Liberty, SC (US); D. Hollens Free, Blackville, SC (US); Stanley A. Brantley, Suffolk, VA (US); Joel S. Peele, Suffolk, VA (US); Jacob B. Fravel, Central, SC (US); William G. Henderson, Jr., Warrenville, SC (US)

(73) Assignee: Clemson University, Clemson, SC (US)

( * ) Notice: Subject to any disclaimer, the term of this patent is extended or adjusted under 35 U.S.C. 154(b) by 149 days.

(21) Appl. No.: 14/795,323

(22) Filed: Jul. 9, 2015

(65) Prior Publication Data
US 2016/0011024 A1    Jan. 14, 2016

Related U.S. Application Data

(60) Provisional application No. 62/023,275, filed on Jul. 11, 2014.

(51) Int. Cl.
*G01F 1/30*    (2006.01)
*A01D 29/00*    (2006.01)
(Continued)

(52) U.S. Cl.
CPC ............. *G01F 1/30* (2013.01); *A01D 29/00* (2013.01); *A01D 41/1272* (2013.01); *A01D 2033/005* (2013.01)

(58) Field of Classification Search
CPC ...... G01F 1/30; G01F 1/00; G01F 1/28; A01D 75/00; A01D 29/00; A01D 2033/005; G01L 5/0076; G01L 3/24; B60R 2021/01516
(Continued)

(56) References Cited

U.S. PATENT DOCUMENTS 3,469,634 A    9/1969  Whitesides
3,565,178 A    2/1971  Whitfield
(Continued)

FOREIGN PATENT DOCUMENTS

WO    WO2014/197973 A1    12/2014

OTHER PUBLICATIONS

Fravel, et al.; "Development and Testing of an Impact Plate Yield Monitor for Peanuts," 2013 ASABE Annual International Meeting; Paper No. 1620969, Jul. 21-24, 2013, (10 pages).
(Continued)

*Primary Examiner* — Lisa Caputo
*Assistant Examiner* — Nigel Plumb

(57) ABSTRACT

Yield monitoring systems for harvesting machines and methods that can provide yield monitoring of crops are described. Machines include those that pneumatically convey crop through the machine such as peanut harvesting machines. The yield monitoring system includes a force sensor that can be located in conjunction with a duct of the harvesting machine such that impact of the crop materials on an impact plate within the duct will be registered by the force sensor. This registration can be used to determine a mass flow rate for the crop, which can be correlated to yield of the crop. The systems can include additional components such as optical monitors, moisture sensors, and pressure sensors.

24 Claims, 15 Drawing Sheets

(51) Int. Cl.
*A01D 41/127* (2006.01)
*A01D 33/00* (2006.01)

(58) Field of Classification Search
USPC .............. 73/861.73, 861.71, 861, 862, 541, 73/862.381, 862.49, 862.391, 862.041
See application file for complete search history.

(56) References Cited

U.S. PATENT DOCUMENTS

| | | | |
|---|---|---|---|
| 3,595,078 A | 7/1971 | Beck | |
| 4,230,188 A | 10/1980 | Paulk | |
| 4,280,419 A | 7/1981 | Fischer | |
| 4,765,190 A | 8/1988 | Strubbe | |
| 4,821,637 A | 4/1989 | Viaud | |
| 4,933,589 A | 6/1990 | Strubbe | |
| 5,282,389 A | 2/1994 | Faivre et al. | |
| 5,343,761 A | 9/1994 | Myers | |
| 5,585,626 A | 12/1996 | Beck et al. | |
| 5,739,429 A | 4/1998 | Schmitkons et al. | |
| 5,847,568 A * | 12/1998 | Stashkiw | A01G 25/167 137/78.3 |
| 5,887,669 A | 3/1999 | Ostler et al. | |
| 5,964,077 A * | 10/1999 | Guinn | A01D 41/14 56/10.2 E |
| 6,003,387 A | 12/1999 | Larson et al. | |
| 6,068,059 A * | 5/2000 | Bajema | A01D 33/12 171/130 |
| 6,073,550 A | 6/2000 | Goossen et al. | |
| 6,192,664 B1 | 2/2001 | Missotten et al. | |
| 6,223,848 B1 | 5/2001 | Young et al. | |
| 6,272,819 B1 | 8/2001 | Wendte et al. | |
| 6,431,981 B1 * | 8/2002 | Shinners | A01D 43/085 460/6 |
| 6,460,008 B1 * | 10/2002 | Hardt | A01D 41/1277 460/1 |
| 6,525,276 B1 | 2/2003 | Vellidus et al. | |
| 6,675,561 B2 | 1/2004 | Davis et al. | |
| 6,809,821 B2 | 10/2004 | Thomasson et al. | |
| 6,820,459 B2 * | 11/2004 | Beck | G01F 25/0007 702/104 |
| 6,874,304 B2 * | 4/2005 | Clauss | A01D 43/085 460/1 |
| 6,988,857 B2 | 1/2006 | Kroemmer et al. | |
| 7,249,449 B2 | 7/2007 | Goering et al. | |
| 7,430,845 B2 * | 10/2008 | Kormann | A01D 43/085 460/1 |
| 7,743,590 B1 | 6/2010 | Gidden et al. | |
| 7,815,001 B2 | 10/2010 | Liljeblad et al. | |
| 7,873,456 B2 | 1/2011 | Erdmann et al. | |
| 8,478,493 B2 * | 7/2013 | Anderson | G05D 1/024 37/348 |
| 8,504,310 B2 | 8/2013 | Landphair et al. | |
| 9,253,941 B2 * | 2/2016 | Clark | A01D 34/006 |
| 9,322,629 B2 * | 4/2016 | Sauder | A01D 45/021 |
| 9,506,786 B2 * | 11/2016 | Strnad | A01D 41/1272 |
| 2007/0039303 A1 | 2/2007 | Mitchel | |
| 2011/0102168 A1 * | 5/2011 | Mariman | A01C 7/082 340/451 |
| 2013/0233088 A1 * | 9/2013 | Noble | A01C 7/105 73/861 |
| 2013/0317696 A1 | 11/2013 | Koch et al. | |
| 2014/0076218 A1 | 3/2014 | Liu | |

OTHER PUBLICATIONS

Free, et al.; "Testing of an Impact Plate Yield Monitor for Peanuts: Mounting Configurations and Air Pressure Correction," 2014 ASABE Meeting Presentation, Paper No. 1914021; Jul. 13-16, 2014; (6 pages).
Monfort; Peanut Money-Maker Production Guide—Clemson University—2013, (77 pages).
Omer, et al.; "Comparative Study on Different Peanut Digging Blades," *Agric. Mech. Asia. Afr. Lat. Am.* (Jun. 2001) 32(3) pp. 43-45.
Roberson; "Improving Harvesting Efficiencies for Peanut Diggers,:" N.C. State University; (downloaded from Web on Aug. 24, 2016); (1 page).
Warner, et al.; "Variable Depth Peanut Digger: Part I—Design and Testing," 2014 ASABE and CSBE/SCGAB Annual International Meeting; Paper No. 1914163, Jul. 13-16, 2014, (7 pages).
Warner, et al.; "Variable Depth Peanut Digger: Part II—Digging Loss Analysis," 2014 ASABE and CSBE/SCGAB Annual International Meeting; Paper No. 1914272, Jul. 13-16, 2014, (7 pages).
Publication—Optical Peanut Yield Monitor Development and Testing—J.A. Thomasson, R. Sui, G.C. Wright and A.J. Robson / 2006 American Society of Agricultural and Biological Engineers ISSN 0883-8542 (10 pages).
Conference Paper—Microwave Flow Meter / Internet www.researchgate.net/publication/224564814_Microwave_mass_flow_meter_for_pneumatic_particulate_solids. Dated Jun. 9, 2015 (2 pages).

* cited by examiner

IMPACT MASS FLOW SENSOR FOR MONITORING PEANUT HARVEST YIELDS

CROSS REFERENCE TO RELATED APPLICATION

This application claims filing benefit of U.S. Provisional Patent Application Ser. No. 62/023,275 having a filing date of Jul. 11, 2014, which is incorporated herein by reference.

BACKGROUND OF THE INVENTION

As the need for agricultural efficiency and productivity continues to increase, producers must find ways to maximize their crop's potential. Economic drivers arise from increases in fertilizer and herbicide cost, and environmental sanctions call for better pesticide management. Precision agriculture concepts and methods are showing great promise in meeting the world's needs for efficient agricultural practices and are becoming a staple in most row crop producers' management strategies. For instance, cotton and corn producers are using yield monitors to define and assess different zones of production and are managing these zones with variable rate application of inputs. Application of yield monitoring technologies to the production of cotton and corn has improved crop management and profits as they allow the producer to make real time adjustments to management strategy when the yield goals for zones are not met. Through such strategies producers are making progress in increasing yield while decreasing cost and field inputs.

The development of precision agriculture devices and methods that would be applicable to the peanut harvest could similarly improve crop management and profits in this industry. Producers are already using zone management in peanut harvesting but unfortunately have no way of quantifying whether what they are doing is working or is not working: they have no report card.

Research has been carried out in an attempt to develop precision agriculture yield monitoring systems that can be viable in peanut harvesting. For example, Thomas et al. (Applied Eng. in Agric. 15(3):211-216, 1999; U.S. Pat. No. 6,525,276) developed a Peanut Yield Monitoring System (PYMS) that included load cells mounted below the hopper basket of a peanut harvester. Further studies (Durrence et al., Precision Agriculture, 1(3):301-317, 1999) evaluated the PYMS and showed that the system was able to construct field data for the harvested crop. Research was also conducted using the PYMS to detect disease in peanut plots (Perry et al., ASABE Paper No. 021167. St Joseph, Mich.: ASABE, 2002). In this study, researchers found that the yield monitoring system was able to be spatially correlated to diseases in the field as a function of yield. Unfortunately, while the PYMS demonstrated good ability to predict load and field weight, its in-load resolution was poor relative to yield monitoring technologies available for grains and cotton.

Another study (Kirk et al., ASABE Paper No. 12-1337625. St Joseph, Mich.: ASABE, 2012) developed a system for recording yield from research plot studies using load cells on batches of peanuts from each test plot. While this system could not be adapted for use by a producer, it was reported to have the potential to more than double harvestable plots per clock hour and triple plots per labor hour for research studies.

Research has also been conducted in the use of optical yield monitor sensors in peanut harvests. Thomasson and Sui (Applied Eng. in Agric. 19(6):631-636, 2003) developed and tested an optical sensor for pneumatically conveyed crops. The research concluded that the optical monitor experienced a mean error of 5.7% and a maximum error of 26.6%. Research employing the Ag Leader® optical cotton yield monitors for peanut harvesting was also conducted (Rains et al., Applied Eng. in Agric. 21(6):979-983, 2005). This research showed that the Ag Leader® system can be used for peanut harvest but had potential for errors from abrasion as well as need for further research in calibration. Methods for reducing dust and abrasion were made for the second year of the study. Further adaptations and modifications to this system were tested by Porter et al. (ASABE Paper No. 12-1338357, 2012). They developed and tested "dirt deflector" high density plastic ramps upstream from the optical sensors to reduce the amount of debris that would be flowing across the sensors. The deflectors also included a slit in the chute to allow air to pass over the sensors to act as a cleaning flow of air over the sensors. Optical yield monitors are the only yield monitoring systems for peanuts noted in published research studies in recent years. Problems still exist with optical yield monitors, however. For instance, problems with debris, particularly mud and other heavy debris that is not adequately removed by deflectors, still present significant issues in accurately monitoring crop yield.

Impact plate yield monitoring systems are used in modern agricultural practices for conventional grain crops such as corn to gather data on the mass flow of the crop at various stages of harvest and storage. The system operates by using load cell or other force measurement technology to give a mass flow reading as a function of sum of sensor output per unit time. The data obtained in field use can be instantaneous and can be a good indicator of variation in the field zones. These data can then be used to make management decisions and prescription maps for field applications. Unfortunately, existing impact plate yield monitoring systems are not applicable to peanut harvesting.

A need exists for yield monitoring technology devices and methods that can be used to improve management capabilities in peanut harvesting. The successful development of commercially available devices and methods will translate to increases in profit in peanut production.

SUMMARY OF THE INVENTION

In accordance with one embodiment of the present disclosure, a yield monitoring system for a harvesting machine is disclosed that includes a force sensor (e.g., a load cell) in mechanical communication with an impact plate. The impact plate can be located adjacent a wall of a pneumatic crop conveyance duct of the harvester. In one embodiment, the impact plate can include one or more apertures therein that are of a size to allow air flow through the impact plate and block flow of crop through the impact plate.

Other components can optionally be included in the yield monitoring system such as optical sensors, air pressure sensors that can monitor pressure within the pneumatic conveyance system, moisture sensors, unloading cylinder pressure sensors, etc. Such additional components can improve correlation between the yield predicted by use of the system and the actual yield.

Also disclosed is a method for monitoring crop yield. The method can include connecting the force sensor to the impact plate and monitoring the impact of the crop into the impact plate by use of the force sensor as the crop is conveyed through the duct during harvesting. The information thus obtained can provide a route to monitor yield of the crop.

The machines and methods can be particularly beneficial when utilized in peanut harvesting.

Other features and aspects of the present disclosure are set forth in greater detail below.

BRIEF DESCRIPTION OF THE DRAWINGS

A full and enabling disclosure of the subject matter, including the best mode thereof, directed to one of ordinary skill in the art, is set forth more particularly in the remainder of the specification, which makes reference to the appended figures in which.

DETAILED DESCRIPTION

It is to be understood that the terminology used herein is for the purpose of describing particular embodiments only and is not intended to limit the scope of the present invention. The present discussion is a description of exemplary embodiments only, and is not intended as limiting the broader aspects of the present invention.

Generally speaking, the present disclosure is directed to yield monitoring systems for harvesting machines and methods that can provide yield monitoring of crops, and in particular crops that are pneumatically conveyed through at least a portion of the harvester. The disclosed systems and methods can be particularly beneficial for use in peanut harvesting, but it should be understood that while the bulk of this disclosure discusses peanut harvesting machines, the disclosure is in no way intended to be limited to peanut harvesting. The systems and methods may be useful in harvesting any edible legume as well as any other crop that is pneumatically conveyed during harvesting such as and without limitation, sugar cane and forage crops such as alfalfa and clover. The advancements in real time yield monitoring and the precision agriculture technologies available through use of the disclosed systems and methods can allow for improved management capabilities and reduced input costs for a number of pneumatically conveyed crops.

The yield monitoring system includes an impact-based apparatus that includes a force sensor that can be located in conjunction with a pneumatic duct of a harvesting machine. A force sensor can include, for instance, a load cell, a strain gauge, a torque sensor, a pressure gauge, a force sensing resistor, etc. The force sensor is located in conjunction with a duct of the harvester through which crop is pneumatically conveyed. The arrangement of the impact sensor is such that impact of the crop materials within the duct will be registered by the force sensor. This registration can be used to determine a mass flow rate for the crop, which can be correlated to yield of the crop. The yield monitoring system can be quite accurate, for instance exhibiting an error rate with regard to actual crop harvest of about 15% or less, about 13% or less, about 10% or less or about 7% or less in some embodiments.

Beneficially, the components of a system can be easily installed in existing harvesting machines and the system can be low maintenance and provide long-term use. This can allow for retrofit packages of the yield monitoring system that can be easily adapted to and maintained on harvesters that utilize pneumatic conveyance. Moreover, the components can be utilized in conjunction with any pneumatic conveyance harvesting machine used at any point during a harvest, including, without limitation, combines, transfer machines, collection devices, storage devices, and so forth.

Figure 1:
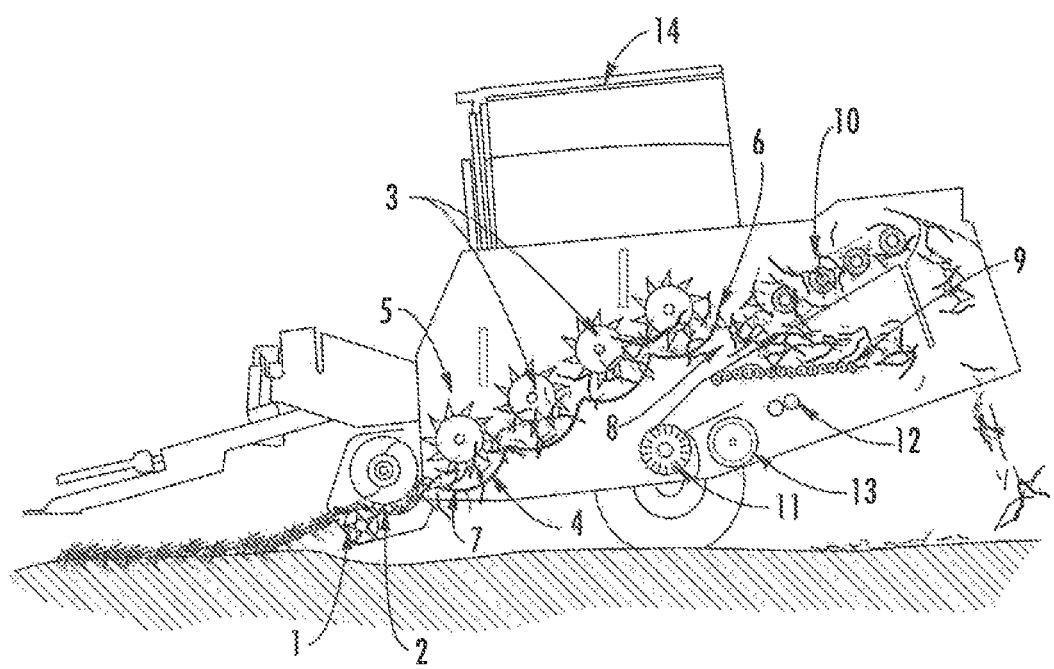
FIG. 1 is a schematic showing a generalized view of a peanut harvester.

FIG. 1 illustrates a typical peanut harvester in which the peanuts are conveyed pneumatically by use of an air lift fan from the disc separator 9, where the peanut pods are separated from vines and other foreign material and sent to the peanut dump bin 14 via a delivery chute (not shown in FIG. 1). The peanut harvester can include other typical components of a harvester such as, and without limitation, a pickup 1, a header auger 2, spring tooth cylinders 3, cylinder dirt removal screens 4, overhead teeth 5, retention board 6, concave teeth 7, peanut extractor 8, walker cylinder 10, cleaning fan 11, stemmer 12, collection auger 13, and so forth.

Figure 2:
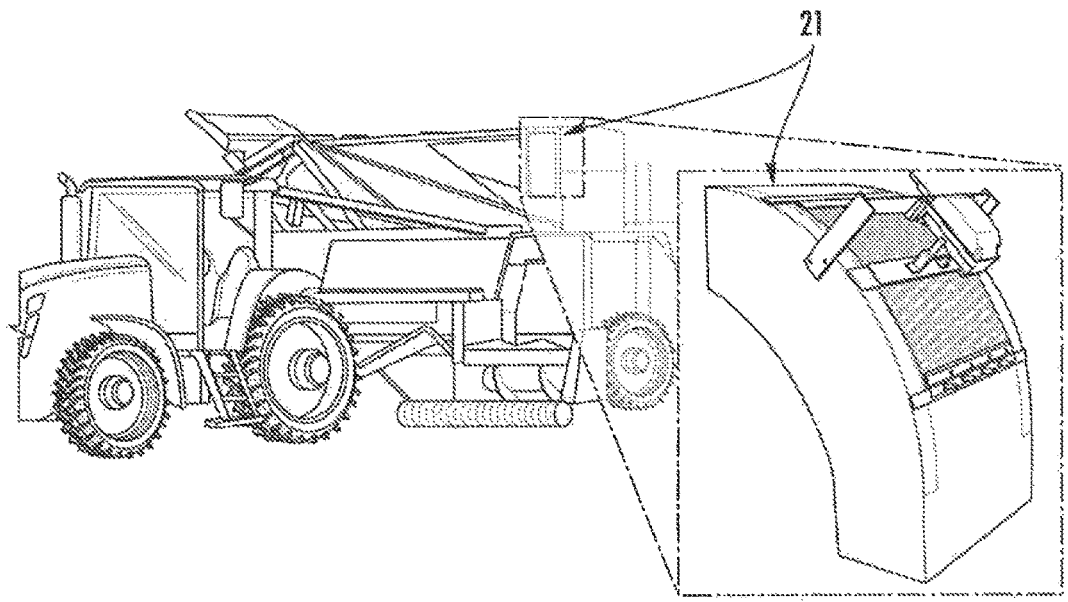
FIG. 2 illustrates a typical peanut harvester including a delivery chute modification to include an impact mass flow sensor.
Figure 4:
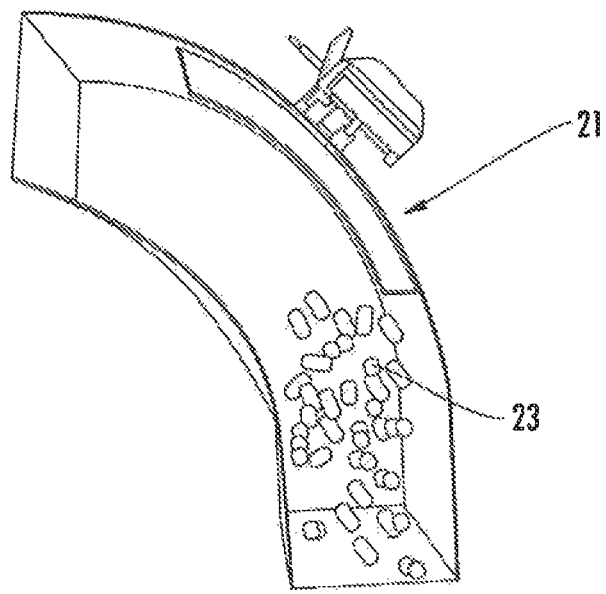
FIG. 4 schematically illustrates an impact sensor during use.

The force sensor of the presently disclosed yield monitoring systems can be located in conjunction with a section of the harvester through which the peanuts are pneumatically conveyed. For instance, the force sensor can be located in conjunction with the peanut conveying duct downstream of the collection auger 13 and prior to entrance to the dump bin 14. As shown in FIG. 2, the delivery chute 21 of a harvester can include one or more elbows through which the flow direction of the pneumatically conveyed crop will be altered (see the inset of FIG. 2 and FIG. 4). At this point, the crop material 23 will impact the wall of the delivery chute 21, and this can provide a desirable site for measuring impact of the crop by use of the force sensor. In one embodiment, the interior of a duct may be altered so as to provide an impact site within the duct that can be used to directly or indirectly monitor impact of the crop by use of a force sensor. In general, however, it can be less expensive and more straight-forward to utilize a pre-existing impact site along a pneumatic conveyance chute 21.

Figure 3:
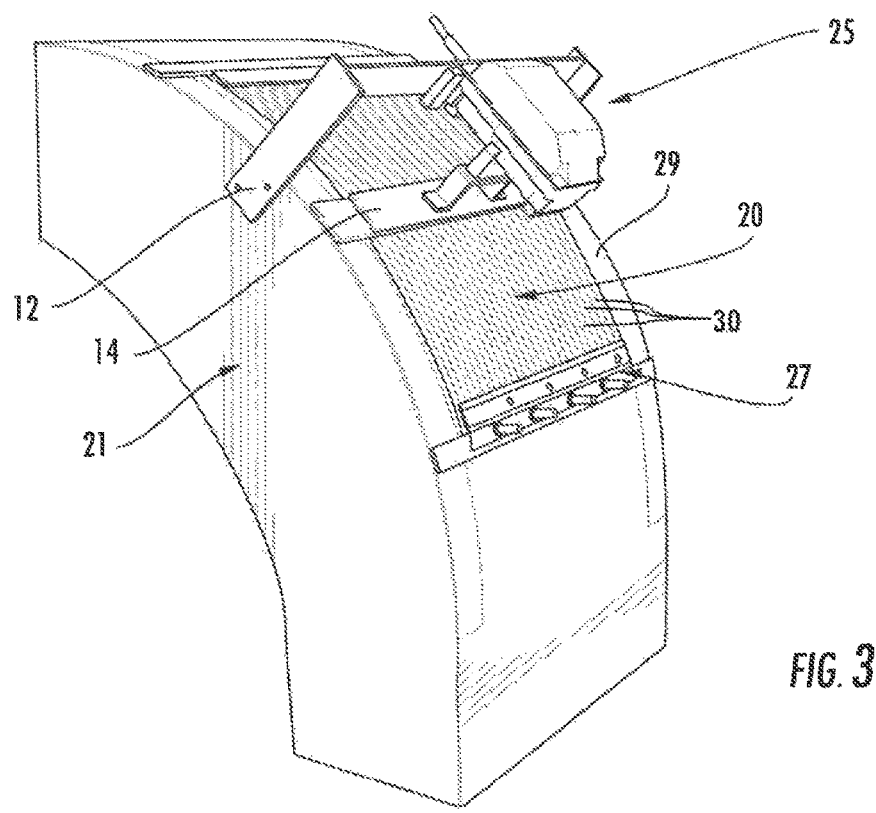
FIG. 3 is a magnified view of the delivery chute modification of FIG. 2.

FIG. 3 presents a closer view of an impact monitoring system following attachment in conjunction with a duct. As can be seen, the force sensor 25 (in this particular embodiment a load cell) is attached to the delivery chute 21 (alternatively termed a duct herein) at attachment point 12 and at another, opposite attachment point (not visible in FIG. 3). The force sensor 25 can be capable of sensing the impact of materials against an internal impact site and conveying that information, for instance to a processor, to obtain information with regard to mass flow through the delivery chute 21. The force sensor 25 can log the obtained data for later examination or alternatively can be in communication with a suitable processor and software as are generally known in the art to obtain real time mass flow information. In either case, the yield data obtained can provide information for use in prescription map development (e.g., management zone definition) and input application optimization.

The force sensor 25 is in mechanical communication with an impact plate 20 that is located adjacent to a portion of the chute 21. More specifically, an impact plate 20 as illustrated in FIG. 3 is in mechanical communication with the load cell 25 via the attachment bracket 14. To obtain suitable response from the force sensor 25, the impact plate 20 can be located adjacent to the wall of the chute 21 but held physically separated all or in part from the wall of the chute 21. For instance, in the embodiment illustrated in FIG. 3, the impact plate 20 is physically attached to the chute 21 at the hinge mount 27 as shown. The remainder of the impact plate 20, however, is physically separated from the delivery chute 21. The separation distance can be dependent on the material being conveyed. For instance when considering peanuts, the separation between the wall 29 and the impact plate 20 can be about 0.2 inches or more at the edges of the impact plate 20. The separation distance should be suitable so as to minimize contact between the impact plate 20 and the duct wall 29 during use and to prevent escape and lodging of conveyed material.

The surface area of the impact plate 20 can be suitable to ensure impact by a majority of the crop as it is pneumatically conveyed through the delivery chute 21. Specific surface areas will, of course, depend upon the geometry of the chute 21. In one embodiment, however, an impact plate 20 can extend around about 45° or more of a radial bend in a pneumatic conveyance chute 21 and extend across about 20% or more of the total linear distance around the duct (e.g., the circumference of a circular duct or the perimeter of a square or rectangular duct) encompassing the primary impact point of the crop. For instance, when considering a rectangular or square conveyance duct, the impact plate 20 can extend across about 80% or more of the width of the duct, about 90% or more, or can extend across the full width of the duct in some embodiments.

While an impact plate may be of a solid construction, it is believed that use of a solid plate can result in difficulty in distinguishing between forces imparted to the impact plate by the crop and those imparted by the conveying air. Thus, in one embodiment, the impact plate can include one or more apertures therethrough that can allow the conveying air to pass through the impact plate while preventing flow of crop through the impact plate. For example, the impact plate 20 can be a bar screen as shown in FIG. 3 that can include a series of slots 30 through the plate for conveyance of air therethrough. Any suitable design and number of apertures may be utilized, however, and a bar screen is not required.

Figure 5:
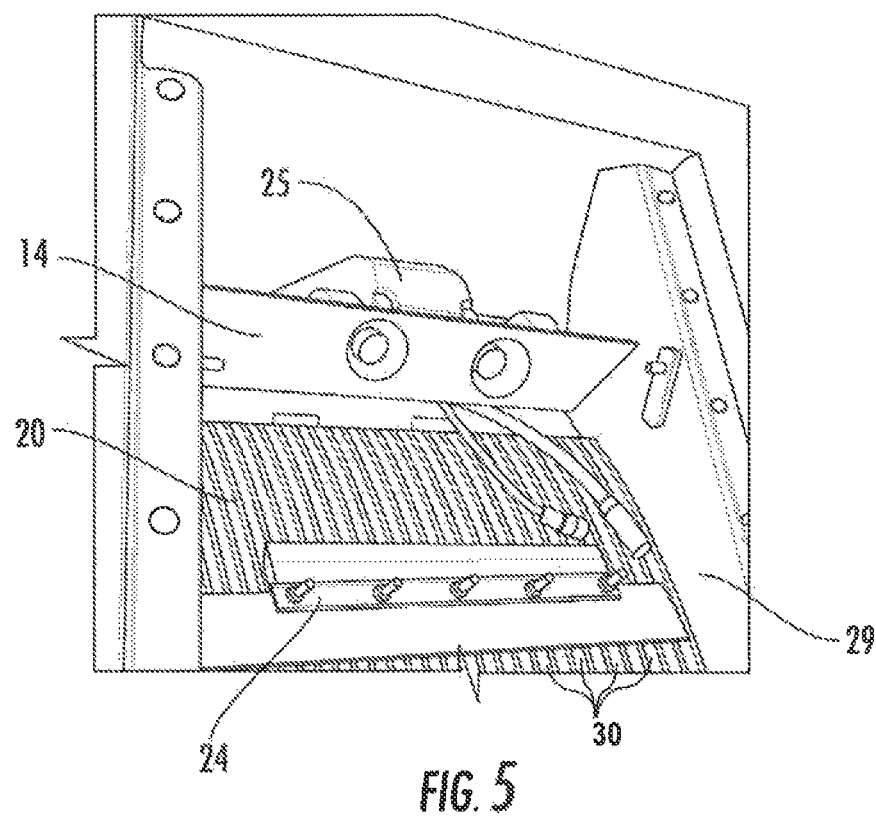
FIG. 5 is a photograph of an impact sensor following placement on a delivery chute of a peanut harvester.

FIG. 5 presents a photograph of an impact plate 20 similar to that schematically illustrated in FIG. 3. As can be seen, the slotted 30 impact plate 20 is connected to the load cell 25 via attachment bracket 14. In addition, the impact plate 20 in this embodiment is connected to the wall 29 of the delivery chute at the upstream hinge mount 24.

Figure 6:
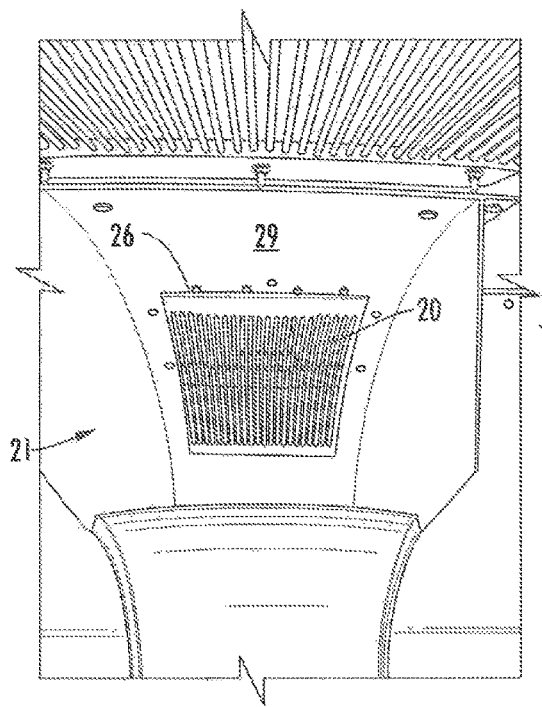
FIG. 6 is another view of the impact sensor of FIG. 5
Figure 7:
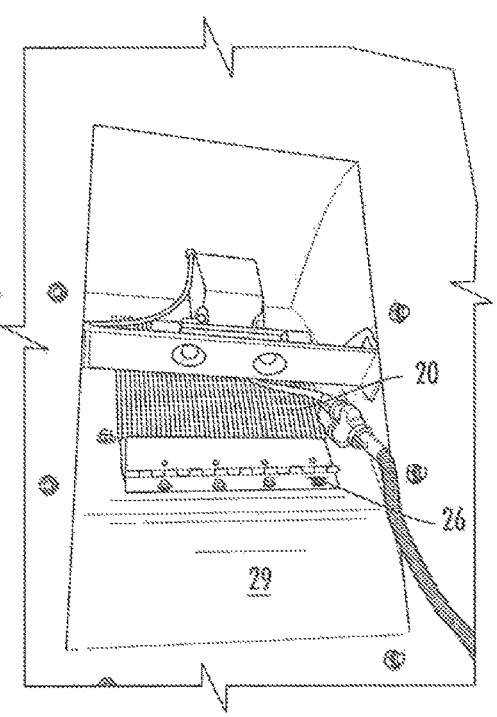
FIG. 7 is another view of the impact sensor of FIG. 5

FIG. 6, FIG. 7, FIG. 8, and FIG. 9 present alternative schemes for connecting an impact plate 20 to the wall 29 of a duct. In the embodiment of FIG. 6 (internal view) and FIG. 7 (external view), the impact plate 20 is connected to the wall 29 of the duct 21 at the downstream hinge mount 26.

Figure 8:
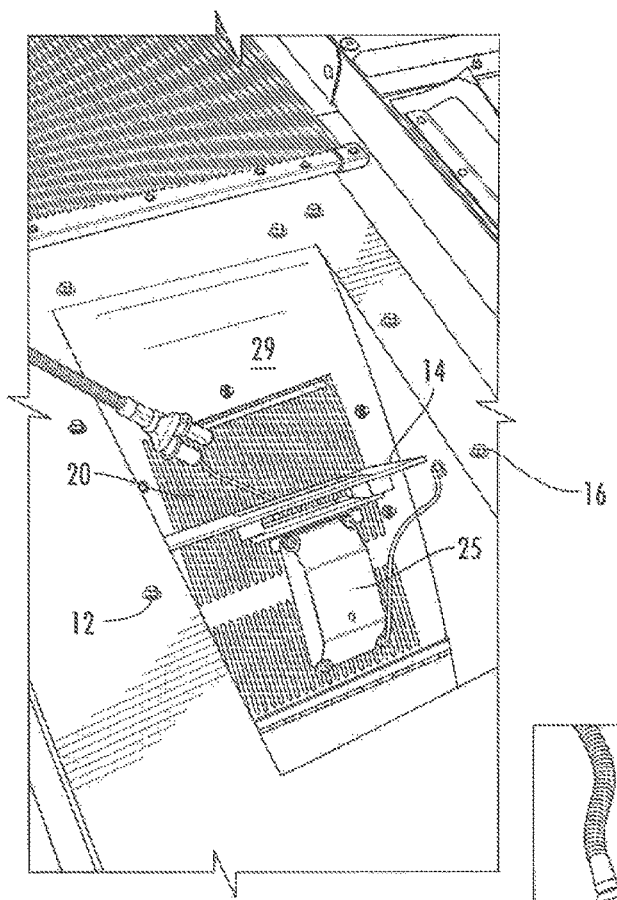
FIG. 8 illustrates another embodiment of an impact sensor on a delivery chute of a harvester.

In the embodiment of FIG. 8, the impact plate 20 is connected to the load cell 25 via the attachment bar 14. The load cell 25 is then connected to the duct wall 29 via an attachment point 12 and opposite attachment point 16, as shown and as discussed above. In this embodiment, however, the impact plate 20 is not connected to the duct wall 29 by a hinge mount or by any other sort of direct connection. In this embodiment the impact plate 20 is only indirectly attached to the wall of the duct 29 via the mounting of the force sensor. Thus, the impact plate 20 "floats" in the elbow section of the duct, mounted solely to the force sensor and not touching the duct. This embodiment is referred to as a "floating plate" embodiment in the example section set out below.

Figure 9:
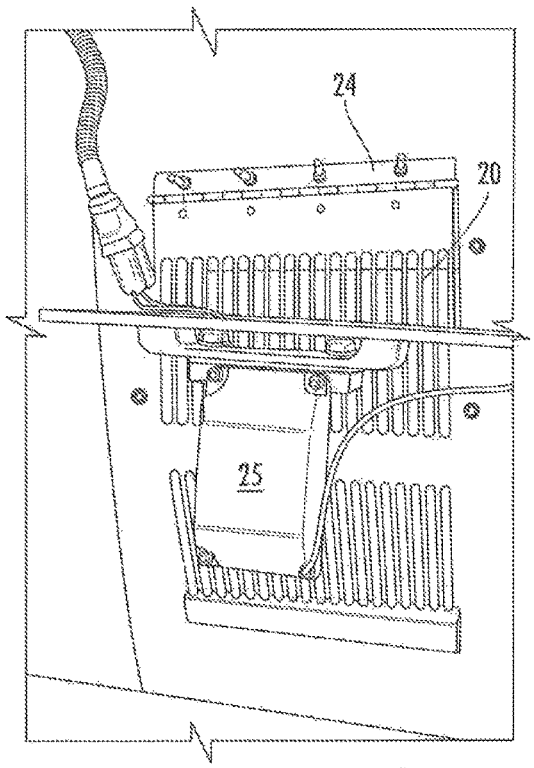
FIG. 9 illustrates another embodiment of an impact sensor on a delivery chute of a harvester.

FIG. 9 presents an embodiment similar to that of FIG. 5 utilizing a hinge mount 24 that in this embodiment is located upstream of the force sensor 25 rather than downstream. In this configuration, with the upstream edge of the impact plate 20 hinged against the duct, the impact of the crop material (e.g., peanuts) can impart a torque on the impact plate/force sensor assembly, which can amplify the impact signal at the force sensor and improve impact detection by the system.

The preferred connection scheme between the various components of a system can depend upon, for example, the specific crop to be conveyed through the system, the cross sectional geometry of the duct, the sensitivity of the force sensor, etc. For instance, a hinged configuration can be less likely to collect and wedge material between the impact plate and the duct wall, which may improve accuracy in yield predictions over the floating plate embodiment. Such results may vary however depending on the nature of the crop to be conveyed in the system. In contrast, a floating impact plate design can decrease error due to vibration of the impact plate caused by the direct connection of the impact plate with the duct. Such vibration can lead to error in the data obtained by the force sensor. Variations in specific connection schemes between the impact plate, the force sensor, and the ductwork are encompassed herein and can be easily envisioned by one skilled in the art and as such are not described in detail. Moreover, the optimization of such schemes depending upon the specific application of the systems and methods are well within the skills of those of the art.

Additional mass flow detectors as well as other types of sensors can be utilized in conjunction with or alternative to the impact monitoring system, which can in one embodiment be utilized to improve accuracy of the yield monitoring system. The complexities and variables of peanut yield monitoring relative to other crops for which yield monitoring is already established may encourage the use of two or more different types of sensors operating in unison to obtain improved accuracy in predictions. Variables contributing to this complexity include wide ranges of any or all of the following within or across fields: the particular type of crop being harvested, moisture contents and therefore as-harvested crop densities, foreign material (FM) type and quantity, and geometry of individual crop pieces (e.g., pod geometry). Thus, in one embodiment, multiple mass flow sensors can be utilized for monitoring the yield of pneumatically conveyed crops. In one particular embodiment, at least one of the mass flow sensors can be an impact mass flow sensor.

Figure 10:
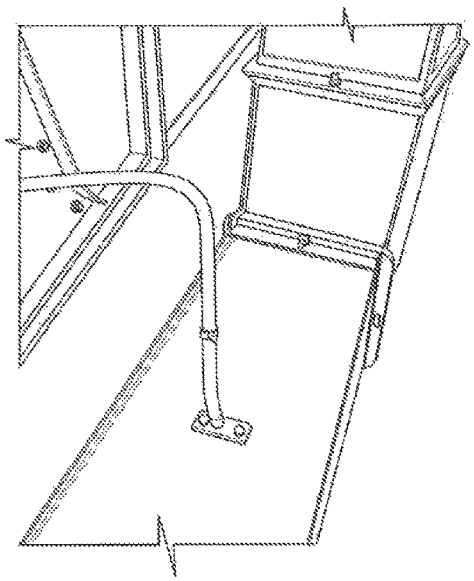
FIG. 10 illustrates an air pressure sensor probe as installed in a clean air duct between the damper and the cross auger of a peanut harvester.
Figure 11:
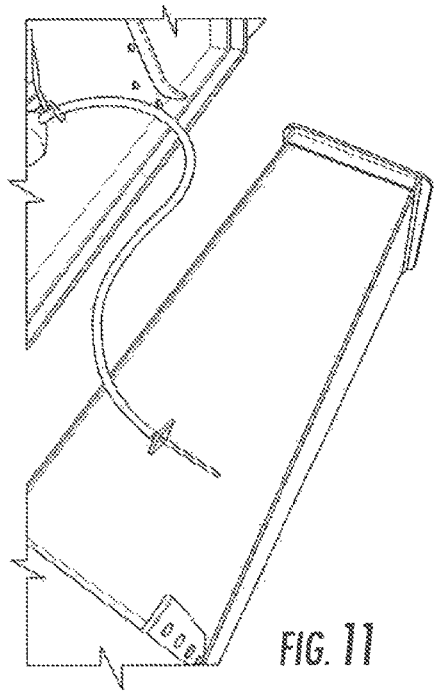
FIG. 11 illustrates the air pressure sensor probe of FIG. 10 prior to installation in the clean air duct.

One sensor type as may be included in a yield monitoring system is a pressure sensor that can detect static and/or dynamic air pressure within the pneumatic conveyance system. For instance, determination of the clean air duct pressure can be used to apply a correction to impact sensor data as the clean air duct pressure can vary depending upon the mass of materials being conveyed through the pneumatic system. Any suitable pressure sensor can be installed in the pneumatic system, one specific example of which for measuring static pressure is illustrated in FIG. 10 and FIG. 11 and further described in the example section below. By way of example, a differential gas pressure sensor can be mounted in a peanut harvester between the air lift fan (item 1 on FIG. 1) and the delivery auger (17 on FIG. 1) to determine the air pressure upstream of the delivery chute.

A pressure sensor can be a differential pressure sensor as is known including a first port open to the atmosphere and a second port connected to a probe at the desired determination location. The probe held within the air stream of the pneumatic system can provide static pressure in the line, and the data obtained can provide information with regard to the mass flow rate through the pneumatic conveyance system.

While measurement of the air pressure within the pneumatic conveyance system alone may provide suitable information to determine mass flow, given correlation values that may be experimentally determined, the air pressure determination can also be utilized as a correction factor in conjunction with one or more mass flow sensors (e.g., an impact mass flow sensor) to improve correlation between the yield valued determined by the monitoring system and actual yield of the crop.

Figure 12A:
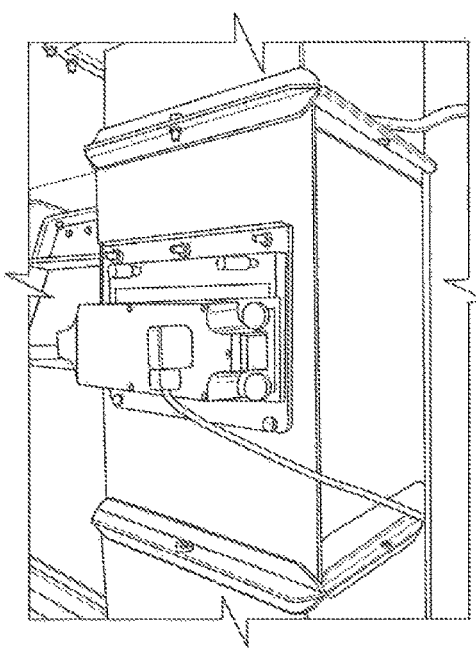
FIG. 12 includes an external image (FIG. 12A) and an internal image (FIG. 12B) of an optical sensor that can be located in line with peanut material pneumatic flow in a peanut harvester.
Figure 12B:
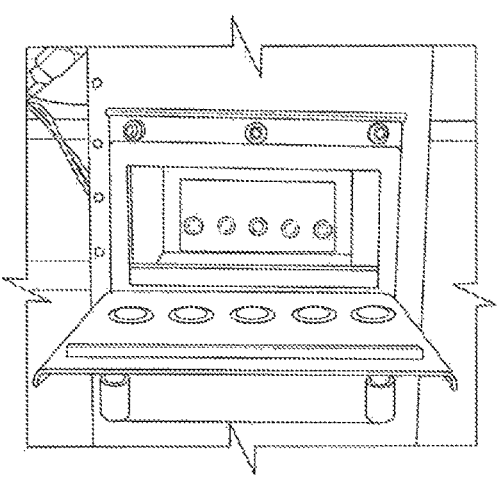

Optical mass flow sensors similar to those as have been utilized in the past in cotton harvesting can be combined with the impact sensor in one system. FIG. 12 illustrates one embodiment of an optical sensor that can be used, with FIG. 12A illustrating the sensor exterior to the delivery chute and FIG. 12B illustrating the sensor interior to the delivery chute. An optical sensor can generally measure interception of light by emission on one side of the duct and detection on the opposite side of the duct. Interception of the light by the passing crop material will decrease the detection level and thus can be used to determine material flow through the duct. Optical detection basically senses a volumetric flow through the duct and therefore cannot detect differences in densities. In terms of gross, wet weight predictions, this means that an optical sensor does not have the ability to correct for differences in densities. However, because buy point weight is generally standardized, for instance standardized to about 7% moisture content in the case of peanuts, this may not be a problem in calibrating a system for buy point weights and an optical sensor can be accurately utilized in predicting dry weights of known moisture content.

When considering peanut harvesting, because the impact sensor is measuring force of impact, it can be closer to representing a true mass flow sensor as compared to an optical monitor. An impact sensor can also correct, as a function of density and material momentum, for differences in pod moisture content as well as distinguish between loose shelled kernels (LSK), foreign material (FM), and sound mature kernels (SMK). The accuracy of the optical sensor in volumetric flow, however, can provide information that when combined with that of the impact sensor can improve the overall yield monitoring of a system.

In one embodiment, a system can include a moisture sensor, for instance in conjunction with an impact mass flow sensor. Analysis of field data has suggested that peanut moisture content, and in particular pod surface moisture content, can affect mass flow sensor response. Thus, in one embodiment, a system can include one or more sensors for estimated the moisture content of the crop carried in the pneumatic conveyance system, and in one particular embodiment, the one or more sensors can be utilized to estimate the surface moisture of the crop, e.g., the pod surface moisture of peanuts conveyed by the system.

A moisture sensor can be located in any convenient location on a farming implement. For instance, and with reference to FIG. 1, a moisture sensor can be located at or near the end of the cross-auger trough (e.g., at or upstream of the delivery auger 17) and prior to the peanuts entering the delivery chute 21. In one embodiment, a moisture sensor can be located within the storage basket 4 or within the delivery chute 21. Alternatively, a system can include multiple moisture sensors that can be located in different locations throughout the harvester.

Moisture sensors as may be incorporated in a system can include, without limitation, capacitive sensors, resistive sensors, microwave transmittance sensors, microwave reflectance sensors, relative humidity sensors, infrared light absorption sensors, and so forth.

A capacitance sensing type of moisture detector works upon the premise that variation in the humidity of a given area can be detected through detection of the related variation in the electrostatic capacitance between a pair of electrodes. Measurement of moisture in capacitance-based sensors utilizes the fact that the capacitance of a given sensor depends on the dielectric constant of the crop in the sensor. Since the dielectric constant for the crop (e.g., peanuts) is much lower than the dielectric constant for water, a small change in the amount of moisture in the crop causes a relatively large change in its dielectric constant. This change in dielectric constant with moisture content makes it ideal for use in measuring moisture content.

One example of a flat plat capacitive sensor as may be utilized is described in U.S. Pat. No. 6,249,130 to Greer, which is incorporated herein by reference. Briefly, a flat plate capacitive sensor can include a capacitive sensor element that in turn includes a dielectric substrate having a planar configuration, a pair of sensing electrodes arranged in spaced relation on one surface of the substrate, and shield electrodes arranged on the substrate. A first shield electrode can be arranged on the opposite surface of the substrate from the sensing electrodes and parallel thereto. The first shield electrode interrupts and thus limits the measuring field defined by the electric field lines generated from one of the sensing electrodes when an electric current is supplied thereto. A second shield electrode can be arranged on the same surface of the substrate as the sensing electrodes in co-planar relation. This shield electrode can prevent a dense electric field very near the sensor element from severely dominating the capacitive measurement.

A parallel plate or concentric cylinder design can alternatively be utilized in a capacitive sensing design. Typically, a parallel plate capacitive moisture sensor is designed such that the crop material, e.g., a volume of peanuts, serves as the dielectric material of the sensor. The capacitance and therefore the permittivity of a volume of crop volume between the plates can be measured. From this measurement, the moisture of the crop can be determined. There are two common methods for measuring capacitance of a cell defined by the sensor. The first method is to sense the changes in frequency of a variable oscillator that uses cell capacitance as one of its frequency determining elements. The second method is to excite the cell capacitance with a signal having a known frequency and to measure the absolute value of the resulting cell current, usually with a bridge type of circuit and a peak detector, and then to calculate the capacitance of the cell.

U.S. Pat. No. 6,917,206 to Rains, et al., incorporated herein by reference, describes one example of a parallel plate capacitive moisture sensor as may be incorporated in a system. This moisture sensor includes a driven plate to which excitation voltages are applied, a sense plate proximate and parallel to the driven plate for measuring current that passes through the cell, a fill plate adjacent to the sense plate for determining when the cell is full, and a guard adjacent to the sense plate and the fill plate for protecting the sense plate and the fill plate. The guard is electrically isolated from, but at the same potential as the sense plate. The guard is parallel to and dimensionally larger than the sense plate in order to shape the electric field. The presence of the guard plate provides the advantage of straight electric field lines perpendicular to the sense plate and of uniform density throughout the region between the parallel plates. This results in reduced fringe effects and uniform electric field density allowing for equal sensitivity throughout the cell. In addition, the guard shields the sense plate from external electric fields generated by sources other than the driven plate. The fill plate provides the advantage of accurate determination of whether or not the cell is full.

A resistive type moisture sensor can be utilized. A resistive type moisture sensor is similar to a capacitive type sensor but uses a resistance bridge network that compares the electrical resistance of a sample of fixed volume placed between two electrodes to the control value, rather than the capacitance.

U.S. Pat. No. 5,847,568 to Stashkiw, et al., incorporated herein by reference, describes a moisture sensor based upon resistance measurement as may be incorporated in a system. Briefly, the sensor can include two electrode plates that are oriented parallel to one another. The electrode plates have a predetermined length and thickness and are separated by a predetermined distance, configured to optimize the moisture detecting characteristics of the sensor. A control unit can apply an electrical potential across the electrode plates such that the resistance of the crop located there between varies as a function of moisture content. The control unit can measure the resistance of the material to thereby determine the moisture content of the material.

U.S. Patent Application Publication No. 2013/0319263 to Roberts, et al., which is incorporated herein by reference, describes an example of a resistive-type moisture sensor that can be incorporated in a harvester. For instance, the resistive moisture sensor can include at least one pair of sensors, each of which includes a base member, an electrical connection assembly, and a conductive pad. The base, or at least a portion thereof, is constructed of non-conductive material such as an ultrahigh molecular weight polyethylene or the like that can be contoured to fit at the sensing location, e.g., at the outlet of the cross-auger trough, where the crop enters the elevator. The associated pad is constructed of a conductive material such as a metal. The pad is connected to the base so that in use, it is exposed for contact with crop moving through the line. Electrical transmission can be measured between the sensors prior to and during flow of the crop past the sensors. The value of the electrical transmission can be assigned to a moisture value of the crop passing through the line.

A microwave based system is based on the variation in dielectric constant of water as compared to peanuts (or other crop material). Specifically, the variation in the dielectric constant due to the water content of the crop can be measured by monitoring the change in a microwave signal that is either transmitted through or reflected from a volume of the crop. Both the velocity of the microwave signal (or phase shift) and the ultimate signal strength (or attenuation) can be affected by the change in the dielectric constant of the analyzed material. Put simply, the microwave measurement is effected mainly by the excitation of free moisture molecules rather than many other types of materials.

Relative humidity measurements, as in the storage basket can optionally be utilized, though this method may not be preferred due to the time required to reach equilibrium relative humidity in an area compared to the time to fill and subsequently dump the storage basket during a typical harvesting operation.

Another component that can be included in a system is an unloading cylinder pressure sensor that can be utilized to estimate the total weight of a crop held in a container, e.g., the collection basket of a harvester. Application of a basket weighing technology as may applied to peanuts can include use in calibration of a yield monitor, post-process correction of data from yield monitors, and/or to evaluate calibration performance and drift over time; similar systems could also be employed in basket-type cotton pickers. A basket weighing system can also be used independently from a yield monitor, for instance to quantify relative yield per region of a field or per field. The technology can also be employed on peanut dump carts or cotton boll buggies.

There are commercially available weighing systems for dump carts that utilize load cell and strain gauge technologies at the wheel spindles and tongue for weighing the cart. However, these systems are expensive relative to a cylinder pressure monitor as described herein, for instance up to 10 times the cost. Moreover, installation of such systems aftermarket can require custom fabrication to install the system components. Aside from installation of harnesses and a display monitor, installation of the system described below can require only mounting of a basket position switch and installation of a hydraulic tee fitted with a pressure transducer.

Figure 13:
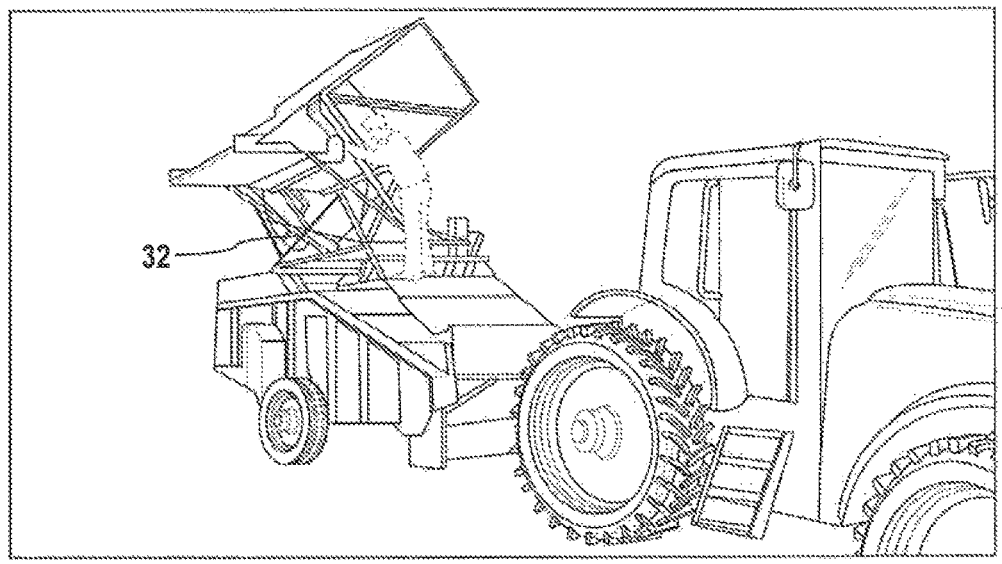
FIG. 13 illustrates an unloading cylinder including a pressure monitor as may be incorporated in a system as disclosed herein.

FIG. 13 illustrates one embodiment of a pressure sensor 32 that can be mounted in the hydraulic circuit that supports a container holding the crop for use during an unloading process. The unloading cylinder pressure can be correlated to the load weight, which when combined with information obtained from the force sensor of an impact monitoring system, for instance through integration with a processor that obtains and processes the force sensor data, can further reduce error in the yield monitoring system.

Sensor data concerning the pressure required to empty a container (e.g., a basket or tank containing the harvested crop) can be combined with data concerning the position of the container to establish a repeatable and accurate representation of the load. In one embodiment, this data can then be used to calibrate the mass flow data without need of fixed, cart mounted or portable scales.

Such a system can be beneficially utilized to that ensure that a crop transport vehicle is full but does not exceed transportation weight limits. This system can also be applied to a field transport device (e.g., a field cart) in lieu of costly load cell based systems (e.g., cart scales). When the system is applied to a field cart instead of a combine it can be used to gather load weights from multiple combines.

In one example of utilization of an unloading pressure sensor, after a full load is in a harvester unloading cylinders can be extended in order to empty the harvester basket into another vehicle (e.g., a field cart). Extension of the unloading cylinders can lead to an unloading cylinder pressure change at the pressure sensor, which can give a measure of total basket weight. In addition, through correlation with the cylinder pressure with the basket location, further refinement of the total basket weight can be obtained (see, e.g., U.S. Pat. No. 8,977,445 to Buettner, which is incorporated herein by reference).

During use of the disclosed systems, data obtained from a mass flow sensor (e.g., an impact monitoring system as described above) from a particular load (as well as data from any other sensors of the system) can be combined with data from an unloading sensor system to provide data concerning the total load volume, weight, or combination thereof. For instance, data can be combined to give a Sum of Sensor Readings (SSR) across the load. These data can then be manipulated according to any of a variety of mathematical relationships relating to load weight and sensor response as would be possible to those skilled in the art. For example, total load weight, as determined by the unloading cylinder pressure sensor, can be divided by SSR, giving weight per unit sensor reading, which can be redistributed across spatial, point data for yield map development. An on-the-go map display can then be based on a prior load's weight per SSR, which can be corrected for logging purposes once a known weight per SSR for the current load is determined.

The present invention may be better understood by reference to the following examples.

EXAMPLE 1

An Ag Leader® 4000201 (Ag Leader® Technology, Ames, Iowa) impact or "grain" sensor connected to an Ag Leader® Integra monitor was adapted to a four row Bush Hog 9004 (Bigham Brothers, Inc., Lubbock, Tex.) pull-type peanut combine. The load cell of the impact monitor was attached to the exterior of the topmost portion of the clean peanut delivery chute of the combine. The impact plate monitor was located outside of a 90° bend where the peanuts are deflected into the hopper basket as shown in FIG. 2. The impact plate was removed from the bend and the load cell was removed from the sheet metal housing used for mounting in a grain combine. The load cell was fixed to a "floating" section of bar screen on the delivery chute and to the side walls of the peanut basket via a mounting bracket as depicted in FIG. 3. The bar screen was fixed to the chute along its lower (upstream) edge by a piano hinge to restrict motion when peanuts were being deflected into the hopper basket. Installation to a section of bar screen allowed for peanuts to strike the plate and log data but reduced the effects of airflow. A shaft speed sensor, normally mounted to the clean grain elevator shaft on a grain combine, was mounted on the blower fan shaft of the peanut harvester.

An optical monitor (Ag Leader® cotton sensor paired with an Ag Leader® InSight monitor) as illustrated in FIG. 12 was used in conjunction with the impact monitor. The sensor is commonly used in cotton harvesting equipment to measure cotton lint yield. The system uses a pair of units for sending and receiving; it is a "through-beam" technology that senses breaks in light transmittance from objects passing between the transmitter and receiver. Mounting of the optical sensor was the same as known in the art.

Both the impact and optical yield monitoring systems were mounted to the same four row pull behind Bush Hog 9004 peanut combine. Both yield monitors use the same pneumatic conveyance systems of the combine, GPS receiver, but independent header height sensors, calibrated to approximately the same settings. Each sensor was calibrated off of the same field loads for comparison of accuracy in calibration. Shaft speed, vibration, header height, and temperature calibrations were preformed independently for the Integra monitor, as would be necessary if used for grain harvest. The vibration and shaft speed calibrations were conducted while the machine was stationary with PTO engaged but no crop flow. The optical monitor logged data at a rate of 1.0 Hz while the impact logged at 0.5 Hz.

Continuous, geo-referenced point data was acquired with the impact and optical sensors simultaneously during harvest. Only Virginia type peanuts were harvested. Load weights for calibration were individually measured using a single axle Richardton cart instrumented with load cells. Each load harvested from a field was dumped into the cart which was calibrated at the beginning of the season.

Data from the yield monitors were imported into Ag Leader® SMS™ software, which is an agricultural, spatial data management software. A 14 second lag time was imposed on both the optical and impact data to account for convolution of the peanuts during transport from the header to the clean peanut delivery duct. Filter limits for minimum and maximum yield were set at 0 kilograms per hectare (kg ha$^{-1}$) (0 pounds per acre (lb ac$^{-1}$)) and 22,400 kg ha$^{-1}$ (20,000 lb ac$^{-1}$) for both datasets. Spatial load summaries from the software for both the impact and optical monitor were compared to Comma-Separated Values (.CSV) files for the point data to verify accuracy. Load summaries were then imported to Microsoft Excel for data analysis.

The predicted load weights for the two sensors were normalized for comparison. This was completed by applying a linear regression with y-intercept equal to zero, correcting the monitor predicted load weights (independent variable) as a function of the actual weights for those loads (dependent variable). Moving averages of instantaneous mass flow data for the two sensors calculated across 20 second intervals were calculated and plotted for comparison and to roughly verify proper operation of the impact sensor throughout the point data, as the optical sensor had already been proven for peanuts at least to some level of accuracy (data not shown).

Preliminary field testing indicated the need for some modifications to the impact yield monitor mount. As discussed above and illustrated in FIG. 2 and FIG. 5, the section of bar screen used as an impact plate was fixed to the chute by means of a hinge on the lower (upstream) portion of the plate. After encountering problems with the vibration calibration function for the impact sensor, the hinge was unattached from the duct as illustrated in FIG. 8, which mitigated the problems. This refinement was completed prior to collection of any of the data used in this report. After dismounting the hinge from the duct, the section of bar screen serving as the impact plate was essentially "floating" at the periphery of the bend on which it was mounted. The load cell utilized four bolts for mounting, two at the plate and two for mounting to the machine. This proved to be sufficient to hold the impact plate in position at the duct without physically touching the duct. The impact plate was positioned with about 0.25 in clearance on all sides, relative to the duct.

There were a total of 38 loads with known weights and simultaneous yield data from the two sensors collected during the season. However, issues with some of the impact sensor data resulted in a paired dataset of only 10 loads, collected from two fields, which are reported here. The other 28 load datasets collected for the optical sensor were intact, as it was collected on a separate monitor. This allowed for analysis of a full season dataset for the optical sensor, but not for full season comparisons between the two sensors.

The Ag Leader® systems apparently use a finite number of calibrations. Because of this, accuracies of the calibrations were not as good as they could be with an infinitely variable linear best fit model with y-intercept equal to zero. The result of these finite calibrations is a marginally calibrated sensor as evidenced when plotting actual load weights as a function of monitor predicted load weights, using all of, and only the loads used to build the calibration. Comparing the scatter of points here to a 1:1 line revealed that the points were disproportionately scattered and not centered on the 1:1 line as they would be with an infinitely variable slope. Several trials of sets of calibrated loads were tested, with generally the same results. In all cases, arrangement of the data around a line through the origin and with slope close to, but not equal to one suggests that the Ag Leader® system is employing a linear best fit model, adjusting the slope, across a finite number of slopes, with a y-intercept of zero.

Figure 14:
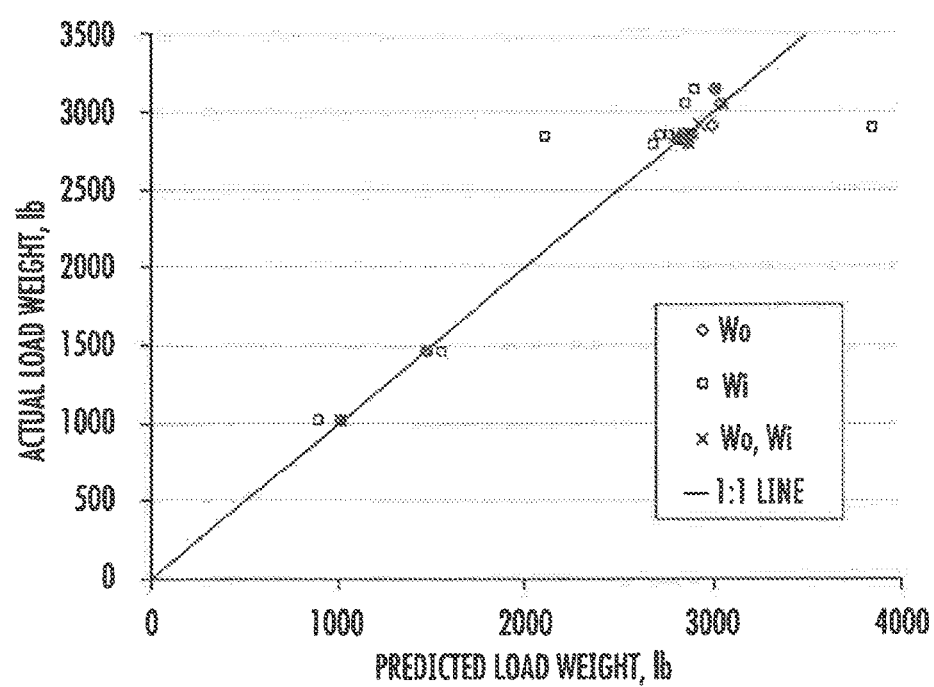
FIG. 14 graphically illustrates the optical, impact, and combined normalized yield monitor predicted load weight as obtained by sensors as described herein vs. actual load weight.

When comparing the normalized monitor predicted load weights to the actual weights, both monitors predicted weights that were comparable to the actual weights of the field. FIG. 14 shows the correlation of the two monitors' normalized yield output to actual weight. The normalized optical monitor predicted load weight is represented as $W_o$, the impact as $W_i$, and both a multiple linear regression incorporating output from both monitors together is as $W_o$, $W_i$.

As can be seen in FIG. 14, there were two visible outliers. The high estimate was hypothesized to be a result of a poor vibration calibration, and the low estimate thought to be a result of plant or other material getting lodged between the impact plate and the duct.

The mean absolute error of the 10 load estimates were 1.54% for the optical sensor, 10.23% for the impact sensor, and 1.23% for the multiple regression model utilizing both sensors together. The mean absolute error of the 38 loads collected across the season for the optical sensor was 9.6% when normalized.

Figure 15:
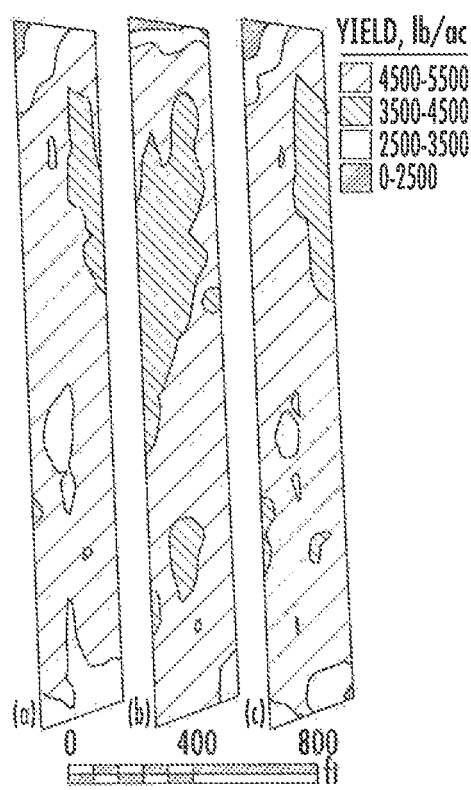
FIG. 15 presents yield contour maps for optical (a), impact (b), and combined (c) normalized yield monitor data as obtained as described herein.

Side by side visual inspection of yield contour maps (FIG. 15) for the two yield monitors revealed that they were somewhat in agreement indicating high and low yields across the fields, with the majority of the area in both maps being in the 3,500 to 4,500 lb ac$^{-1}$ range. However, there were some spatial discrepancies in the maps that could not be explained, the optical yield monitor reporting more lower-yielding areas and the impact yield monitor reporting more higher-yielding areas. The maps in FIG. 15 were created using Farm Works Software® (Trimble Navigation Limited, Sunnyvale, Calif.) for one of the two fields from which the data was collected. The third map in FIG. 15 shows the yield contour map for the multiple linear regressions model using both the optical and impact yield monitor output together. This map is most similar to the optical yield monitor map because the optical sensor prediction is weighted more heavily than the impact sensor prediction in the multiple regressions model.

In order to assess effects of some of the measured variables on yield predictions by the two sensors alone and together, the residuals of predictions were plotted as a function of these variables. Coefficients of determination were calculated for these residuals plots as a rough assessment of sensitivity to these variables. The coefficients of determination are provided in the table below. Correlations of residuals with load weight and load area for the data do not suggest that these variables have a strong relationship with predicted load weight.

| Prediction | Residuals vs Load Weight | Residuals vs Load Number | Residuals vs Actual Yield | Residuals vs Load Area |
|---|---|---|---|---|
| $W_o$ | 0.0078 | 0.3989 | 0.2339 | 0.0395 |
| $W_i$ | 0.0011 | 0.3927 | 0.8458 | 0.2172 |
| $W_o, W_i$ | 0.0116 | 0.1667 | 0.0049 | 0.0014 |

$R^2$

Load number was simply defined as the sequential load number harvested with time. Coefficients of determination as a function of load number for such a small dataset were not high enough to be compellingly indicative of a relationship between load number and load weight prediction, although they were high enough to warrant further investigation, and may be indicative of sensor drift with time as a function of dust and abrasion as suggested in a prior studies with optical sensors. If drift with time was occurring, it would have been revealed in the residuals analysis as a ramped function with a negative slope. Instances of sensor cleaning were not recorded for the season, but a number of researchers and operators worked on the machine and as many as three instances of optical sensor cleaning, by wiping with a dry cloth, were recalled.

Correlation coefficients were not calculated for the data, but the improved coefficient of determination as a function of load number for the multiple linear regression suggested that one of the correlation coefficients for $W_o$ or $W_i$ was positive and the other was negative. Most noticeable in the table is the coefficient of determination between residuals and actual yield (kg/ha) for the impact sensor at 0.8458. The value was believed to be suggestive that the impact sensor responded differently in high yielding areas of the field than in low yielding areas.

Figure 16:
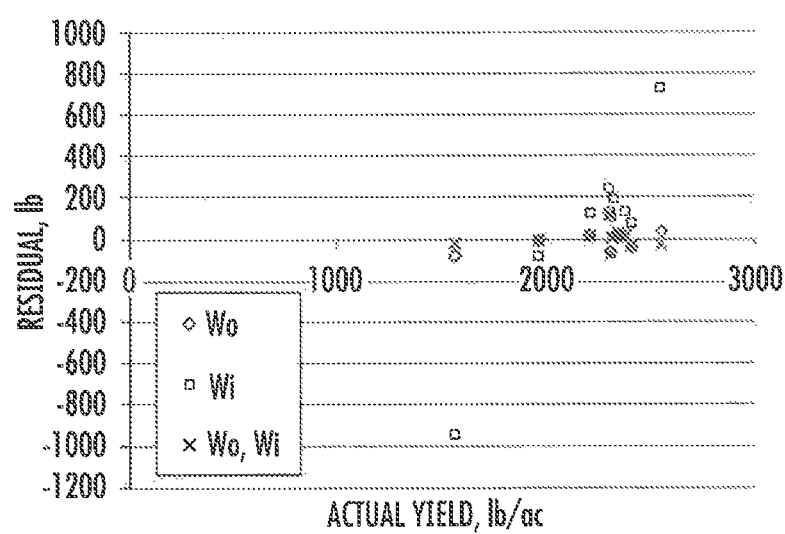
FIG. 16 graphically illustrates the residuals of optical, impact, and combined normalized yield monitor load weight predictions as a function of actual yield.

The residuals plot as a function of actual yield is shown in FIG. 16, with the same legend as described for FIG. 14. The two outliers on the residuals plot are the ones discussed earlier, where underestimate was assumingly attributed to lodging of plant material and poor vibration calibration. These postulations have not been confirmed, but FIG. 16 suggests that there may be another explanation: actual yield may be an important variable in estimating load weight for the impact sensor. In other words, the impact sensor response may be non-linear with mass when the combine is operating at different material flow rates. To provide an indication of its potential effect in accuracy of the impact sensor across this dataset, when a multiple linear regression was developed with $W_i$ and actual yield as independent variables with a non-zero y-intercept, the mean absolute error of the load predictions was reduced to 4.7%.

The vibration calibration of the impact monitor was a difficult calibration to achieve because the combine utilized straw walkers and therefore had much more reciprocating motion and therefore vibration than other harvesters. Additionally, the harvester used was an older machine with many failing parts, worn bushings, and worn bearings which compounded vibration problem. Steps such as replacement of bushings and bearings were taken to minimize this vibration.

EXAMPLE 2

An Ag Leader® 4000201 (Ag Leader® Technology, Ames, Iowa) impact plate was mounted on an Amadas 2108 pull type peanut combine and an Ag Leader® Integra monitor was paired with this sensor. Installation and setup for this system was similar to that described Example 1 and shown in FIG. 2. Two configurations of the bar screen attached to the impact plate sensor were employed: one where the bar screen was allowed to float in its position with no hinge (FIG. 8) and one where the piano hinge position was moved to the downstream side of the airflow (FIG. 6), opposite that shown in FIG. 5. In the configuration including the hinge, the bar screen was made to overlap on the outside of the duct on the upstream side of the airflow. The bar screen was not allowed to touch the sides of the duct in either configuration, providing 0.64 cm (0.25 in) or less clearance on all sides, except where the hinge was mounted. Also, the shaft speed sensor that was already installed on the peanut combine from the factory was used as input for the elevator shaft speed.

The air pressure sensor used was a model 1126 differential gas pressure sensor (Phidgets Inc., Calgary, Alberta, Canada) with a range of −25 to 25 kPa (−3.6 to 3.6 psi). One port on the pressure sensor was left open to the atmosphere and the other connected to a probe mounted in the top of the duct work halfway in between the damper for the clean air fan and the cross auger of the combine (FIG. 10). The probe ported to the sensor (FIG. 11) was inserted to the center of the duct with the open end perpendicular to the air stream to provide static pressure. Data acquisition of the analog signal from the air pressure sensor was conducted using a model 1018 interface kit (Phidgets Inc., Calgary, Alberta, Canada). Data acquisition software was developed in Visual Basic 2010 Express (Microsoft Corp., Redmond, Wash.); analog inputs were collected at a data rate of 10 Hz, logging the average of 10 readings each second. Spatial position was logged each second and provided by a model 1040 GPS (Phidgets Inc., Calgary, Alberta, Canada).

Linear regression models were developed using the Analysis ToolPak Add-In for Microsoft Excel 14.0 (Microsoft Corp., Redmond, Wash.) with the sum of sensor readings (SSR) across every data point logged for each load as the independent variables and each corresponding load weight as the dependent variables. Because the AgLeader Integra data export does not provide raw sensor data, Impact plate sensor SSR for each load was calculated as the sum of the crop flow readings (lb/s) and fan pressure sensor SSR for each load was calculated as the sum of the air pressure readings (psi).

Both runner type and virginia type peanuts were harvested during the season. The first half of the season the impact plate was in the floating configuration (FIG. 8) and during the second half of the season in the hinged configuration (FIG. 6). Each load harvested was weighed in a Pioneer dump cart fitted with scales.

Figure 17:
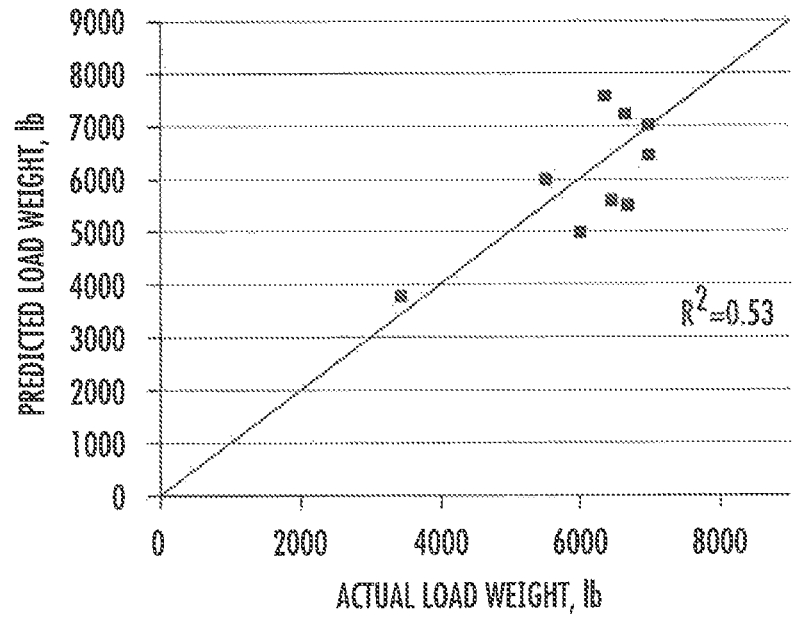
FIG. 17 graphically illustrates the predicted load weight vs. actual load weight obtained using a floating plate configuration of an impact monitor sensor for single variable linear regression as a function of impact plate sum of sensor readings (SSR).
Figure 18:
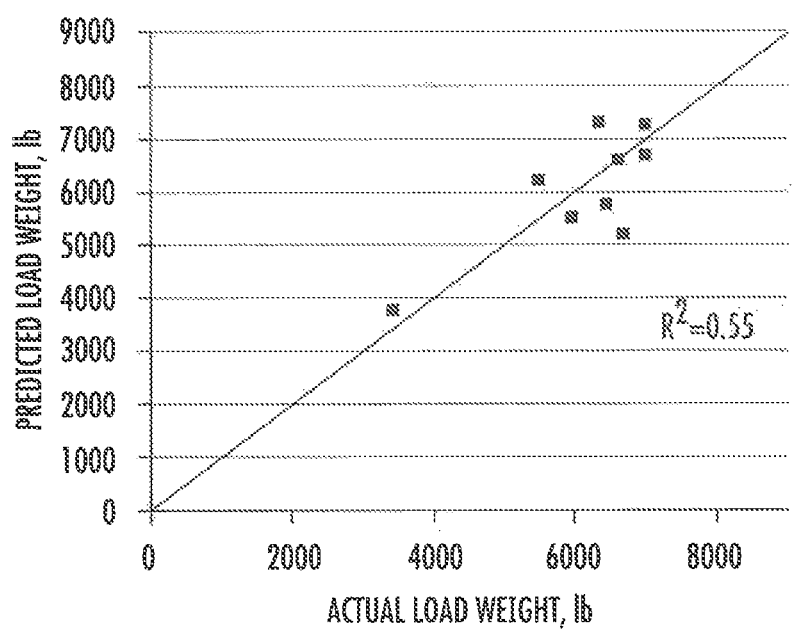
FIG. 18 graphically illustrates the predicted load weight vs. actual load weight obtained using a floating plate configuration of an impact monitor sensor for multiple linear regressions as a function of impact plate and air pressure SSRs.

Average absolute error in load weight prediction for the floating plate configuration (FIG. 8) was 11.6% when using a single variable linear regression as a function of impact plate SSR and 9.8% when using a multiple linear regression as a function of impact plate and air pressure SSRs. Plots of predicted load weight versus actual load weight across the same nine loads for these two models are provided in FIG. 17 (single variable linear regression) and FIG. 18 (multiple linear regression) with coefficients of determination of 0.53 and 0.55, respectively. For these data, inclusion of air pressure as a second regressor improved load weight prediction by 16%.

Figure 19:
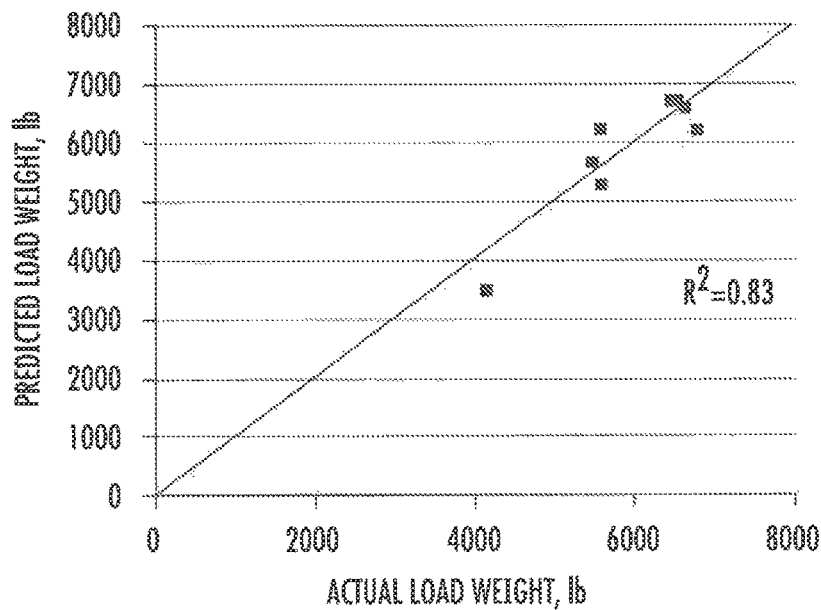
FIG. 19 graphically illustrates the predicted load weight vs. actual load weight obtained for a hinged plate configuration of an impact monitor sensor with a single variable linear regression as a function of impact plate SSR.

Predicted load weight as a function of actual load weight across eight loads (FIG. 19) was substantially improved by changing to the hinged mounting configuration (FIG. 6). In changing configuration from floating to hinged plate, the coefficient of determination was increased from 0.53 to 0.83 (a 57% improvement) and the average absolute error in load weight prediction was reduced from 11.6% to 6.6% (a 43% improvement). These improvements are consistent with field observations that periodic lodging of foreign and vine material between the clean peanut duct and impact plate was reduced when using the hinged plate configuration. In the floating configuration, the majority of lodged material was observed to be at the downstream edge of the bar screen, where the hinge was placed for the hinged configuration.

Comparisons of average absolute load weight prediction error across regression models for the two configurations and two regressors were performed in JMP Pro 10.0 (SAS Institute, Cary, N.C.) using one-way ANOVA and Fisher's LSD tests ($\alpha$=0.05), the results of which are presented in the table below. As compared to floating configuration with impact plate SSR only as a regressor, inclusion of air pressure as a regressor and changing to the hinged configuration both resulted in a numerical reduction in load weight prediction error, although these differences were not statistically different at the $\alpha$=0.05 level. For the single variable regression models using impact plate SSR, a statistically significant difference in load weight prediction error only existed between the floating and hinged configurations at or above the $\alpha$=0.20 level.

| Configuration (Regressors) | Avg. Abs. Error | | SD |
|---|---|---|---|
| Floating (Impact) | 11.6% | a | 5.6 |
| Floating (Impact + Air Pressure) | 9.8% | a | 6.6 |
| Hinged (impact) | 6.6% | a | 5.3 |

An AgLeader® through beam optical cotton sensor paired with an Ag Leader® InSight monitor was tested on the same loads for comparison reasons. Setup and data analysis for the cotton sensor on the Amadas 2108 was the same as described in Example 1. For the loads corresponding to the floating plate configuration, average absolute load weight prediction error of the optical sensor was 7.8% with air pressure correction reduction the error to 5.6%. For the loads corresponding to the hinged plate configuration, average absolute load weight prediction error of the optical sensor was 5.7%. Optical sensor errors were not statistically different from each other ($\alpha$=0.05) and they were generally not statistically different from impact sensor errors, the exception being that the lowest two optical sensor errors (5.6 and 5.7%) were statistically different from the greatest impact sensor error (11.6%).

EXAMPLE 3

Two combines were set up in the same manner with the same components. A series TDH30 pressure transducer (Transducers Direct, Cincinnati, Ohio) was fitted on the hydraulic circuit of the offloading cylinders on Amadas 2108 and 2110 peanut combines (FIG. 20A), indicating hydraulic pressure in the cap ends of the two parallel cylinders that tilt the basket for dumping the load to a wagon, trailer, or dump cart. The pressure transducers were calibrated against a model AFC-5M-25 pressure gauge (DiscountHydraulicHose.com, Philadelphia, Pa.) as shown in FIG. 21A using pressure generated from a model 60726 portable hydraulic power kit (Harbor Freight Tools Co., Camarillo, Calif.).

Figures 20A, 20B:
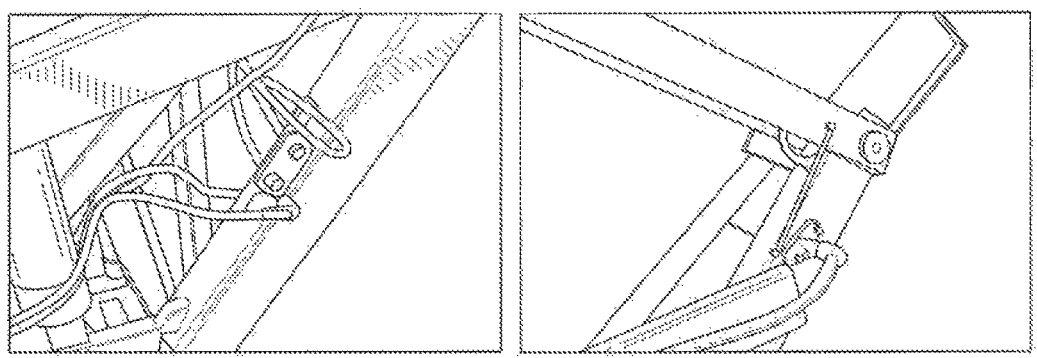
FIG. 20 illustrates a pressure transducer (FIG. 20A) and rotary potentiometer (FIG. 20B) as installed on 2108 peanut combine.
Figure 21A:
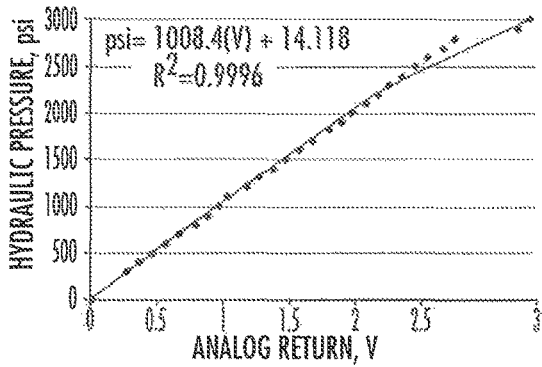
FIG. 21 graphically illustrates calibration of the pressure transducer (FIG. 21A) and rotary potentiometer (FIG. 21B) as illustrated on the 2108 combine of FIG. 20.
Figure 21B:
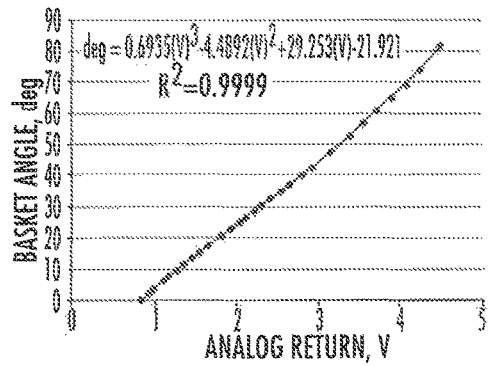
Figure 22A:
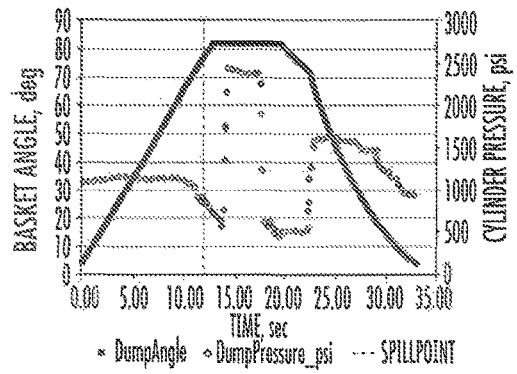
FIG. 22 presents basket angle and dump cylinder pressure as functions of time into dump cycle for two example loads on a 2108 combine. The entire dump cycle is represented in FIG. 22A and FIG. 22B and the portion of the dump cycle below the spill point is represented in FIG. 22C and FIG. 22D, which are trimmed from FIG. 22A and FIG. 22B, respectively.
Figure 22B:
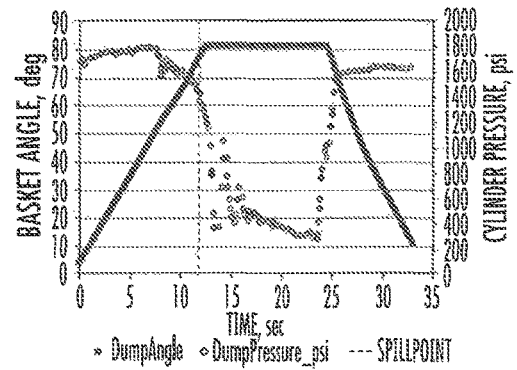
Figure 22C:
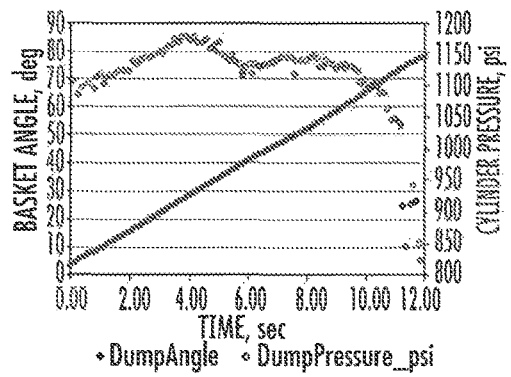
Figure 22D:
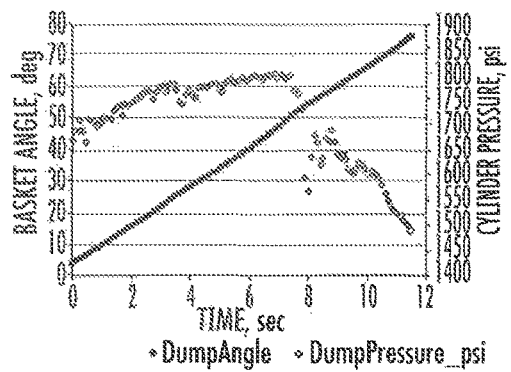
Figure 23A:
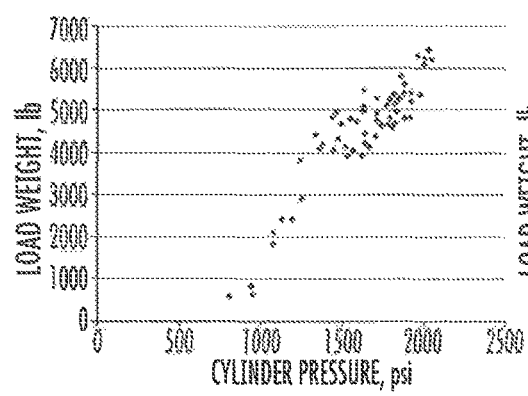
FIG. 23 presents load weight as a function of dump cylinder pressure on a 2108 combine at basket angles of 15° (FIG. 23A), 30° (FIG. 23B), 45° (FIG. 23C), and 60° (FIG. 23D).
Figure 23B:
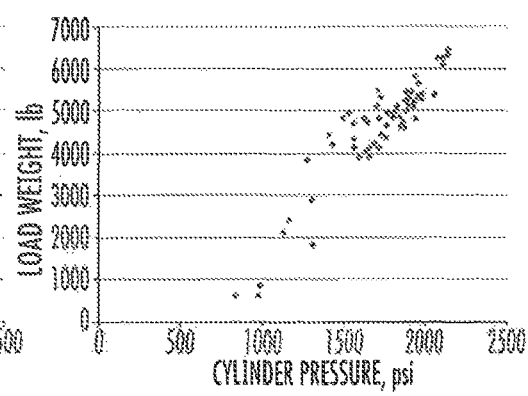
Figure 23C:
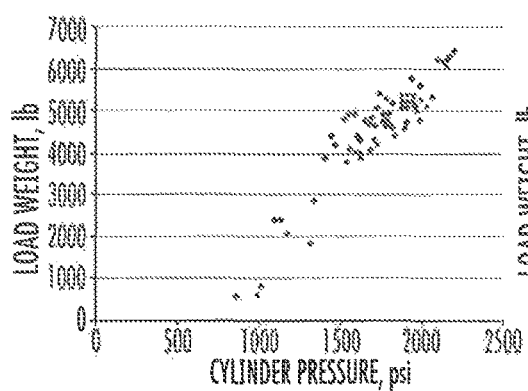
Figure 23D:
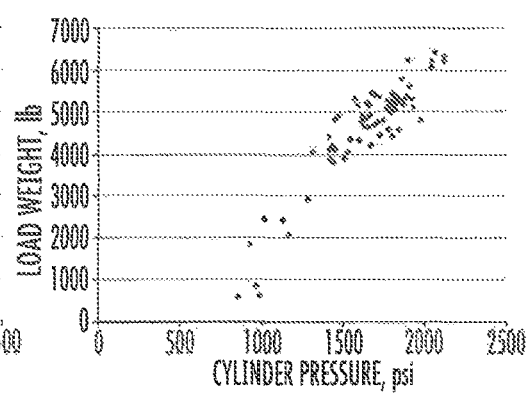

Model AH226124 rotary potentiometer assemblies (Deere & Company, Moline, Ill.) were attached between the supporting frames and the baskets of the peanut combines (FIG. 20B). The rotary potentiometers were calibrated against basket angle relative to the combines (FIG. 21B) using a model 95998 magnetic digital angle gauge (Harbor Freight Tools Co., Camarillo, Calif.). Calibration trends illustrated in FIG. 21 were similar to those for the 2110 combine. The lines on both plots indicate the linear regression functions applied, the equations of which are indicated in overlays on the plots.

Sensor responses from the pressure transducers and rotary potentiometers were logged at 10 Hz with a custom data acquisition program written in Visual Basic 2010 Express (Microsoft Corp., Redmond, Wash.) using model 1018 interface kits (Phidgets Inc., Calgary, Alberta, Canada). Data acquisition for each dump cycle began after the basket angle exceeded a threshold of 4° and continued until the basket angle was once again below 4°. The actual weight of each load was obtained using a Richardton dump cart (Sunflower Manufacturing, Beloit, Kans.) fitted with scales also running a custom data acquisition program written in Visual Basic 2010 Express, and using a model 1046 bridge board (Phidgets Inc., Calgary, Alberta, Canada). Stabilization of bridge data from the dump cart was provided by collecting bridge values at 4 Hz and reporting the average of 20 values.

The data from each dump cycle was trimmed to only include data on the lifting motion from 4° basket angle through 77° and 79° basket angle on the 2108 and 2110 combines, respectively, which generally represented a range below the spill point of the basket. Analysis of the trimmed hydraulic pressure and basket angle data from each dump cycle was conducted by averaging pressure data across each integer degree; the basket generally lifted at 6° $sec^{-1}$ on the 2108 and 4° $sec^{-1}$ on the 2110. This averaging allowed for analysis of the best angular positions at which to take hydraulic pressure readings. Single and multiple linear regression models were developed in Microsoft Excel (Microsoft Corp., Redmond, Wash.) to predict load weight as a function of dump cylinder pressure across a range of basket angles.

Data was from 69 loads of runner and virginia type peanuts harvested with the 2108 combine and 17 loads of runner type peanuts harvested with the 2110 combine during the 2014 season.

The spill point or angle when peanuts generally began to fall from the basket is represented in FIG. 22, which presents representative data from two dump cycles of the 2108 combine. Data used for analysis was only that to the left of the spill point. It was noted on both combines that deceleration or reduction in hydraulic flow rate of the basket during the dump cycle (FIG. 22B and FIG. 22D) resulted in brief periods of erratic pressure readings, as compared to maintenance of a relatively constant hydraulic flow rate (FIG. 22A and FIG. 22C). At between 8 and 9 sec in figures FIG. 22B and FIG. 22D the hydraulic flow rate was reduced as indicated by the decreasing slope of the dump angle series resulting in instability of pressure readings; a similar phenomenon can be seen in FIG. 22A and FIG. 22C at between 11 and 12 sec. This observation is important to consider when designing an operating a system as described here because the fluctuations in pressure readings from deceleration of dump speed would increase load prediction error. It should be noted in FIG. 22A that the maximum angle indicated by the rotary potentiometer was less than the maximum angle that the basket would achieve, but greater than the spill point angle.

Regression models were developed to predict load weight as a function of dump cylinder pressure across loads at one degree increments of basket angle. For the 2108 combine, models were applied across "all loads" (n=69) and across "large loads" (n=62), which were taken to be those greater than 1,724 kg (3,800 lb). For the 2110 combine, only a "large loads" dataset was considered because all 17 loads were in excess of 3,178 kg (7,000 lb). The independent "large loads" analysis for the 2108 was conducted because practical application of this technology will likely most often be for large loads only. Models considered for each dataset were: linear, $2^{nd}$ order polynomial, and $3^{rd}$ order polynomial. FIG. 23 shows load weight for "all loads" on the 2108 combine as a function of dump cylinder pressure at basket angles of 15°, 30°, 45°, and 60°. A rotary potentiometer was used to collect basket angle measurements, but could be replaced with a limit switch or proximity switch.

Figure 24A:
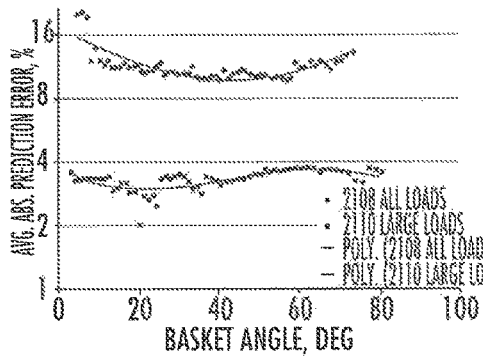
FIG. 24 presents average absolute load weight prediction error across all 2108 loads as a function of basket angle for: linear (FIG. 24A), $2^{nd}$ order polynomial (FIG. 24B), and $3^{rd}$ order polynomial (FIG. 24C) regression models. Solid lines represent $2^{nd}$ order polynomial trendlines to provide indication of angle at which least prediction error is observed.
Figure 24B:
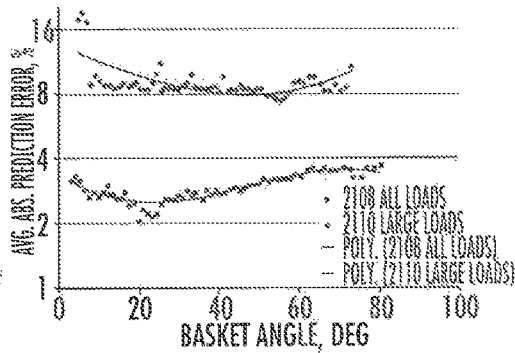

To determine the basket angles at which each load weight prediction model resulted in the greatest accuracy, prediction error for each model type was plotted as a function of basket angle, as seen in FIG. 24. The errors reported in FIG. 24 are the average absolute load weight errors for the indicated regression model type applied at each angle. For each model type, FIG. 24 suggests the best basket position to place a limit or proximity switch. The first derivative of each equation for the polynomial trendlines shown in FIG. 24 were set equal to zero to determine the optimal basket angles reported here. A similar analysis, not graphically shown, was conducted for the 2108 "large loads" data set.

Figure 24C:
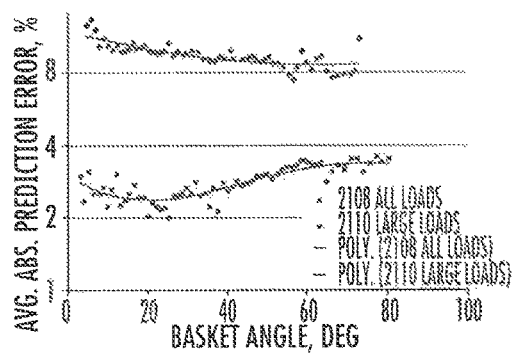

A summary of the results from these analyses is provided in the table below in which the errors and coefficients of determination demonstrated are those for the model applied at the optimal suggested basket angle for the "all loads" and "large loads" datasets. For five out of six models on the 2108 combine, optimal basket angle was between 41 and 46°, or 50% and 56% of total basket angular travel. On the 2110 combine, optimal basket angle was between 22° and 23°, or about 25% of total basket angular travel for all three model types. In both datasets on the 2108 combine the second order polynomial model was numerically most accurate at 8.5% and 5.5% error for the "all loads" and "large loads" datasets, respectively. The second order polynomial model (FIG. 24B) was also most accurate for the 2110 combine, tied with the third order polynomial model (FIG. 24C). As seen in FIG. 24C, the $3^{rd}$ order polynomial model for the 2108 combine data demonstrates substantial variability in error at and near the optimal suggested basket angle; application of this model structure would therefore result in reduced confidence in load weight prediction. This degree of variability was not seen for a similar plot of the "large loads" dataset on the 2108 combine.

be improved by slope, or pitch and roll, compensation from a gyrometer, and hydraulic fluid temperature compensation.

The results from this study show that predicting peanut load weight based on hydraulic pressure at the basket lifting cylinders is possible and would be fairly simple to retrofit onto machines. Such a system could incorporate a switch and a pressure transducer, the switch being used to trigger the pressure measurement at the same basket position for each dump cycle. The switch can be positioned to minimize errors in load weight prediction, although the optimum basket angle may differ from machine to machine, with optimal suggested angles of about 43° and about 22° on the 2108 and 2110 combines in this particular study, respectively. Slowing of the basket speed by reducing hydraulic flow rate delivered to the cylinders was found to have a profound negative effect on load weight prediction. Therefore, optimum basket angle is also affected by the operator's control habits; basket positions at which the operator regularly slows the basket lifting speed are poor positions to choose for pressure indication.

Load weight prediction error was demonstrated to be less than 9% across all load weights on the 2108 combine and less than 6% and 3% across large load weights on the 2108 and 2110 combines, respectively. Some of this error is attributed to inconsistencies in basket lift speed across loads and it is expected that additional error could be explained by machine slope and fluid temperature. The same concepts discussed and presented here for a peanut combine are applicable and relevant to any loads that are hydraulically lifted or dumped, for example in peanut dump carts, cotton pickers, and cotton boll buggies, and the technology employed can be about one tenth of the price of load cell based systems.

EXAMPLE 4

Three "wet" tests were conducted under different pod moisture conditions to evaluate a microwave-based sensor response as a function of moisture; these tests were to demonstrate general trends and the amount of moisture added was not quantified in any of these tests. "Wet Test 1" simulated surface moisture and involved misting peanuts in 2-3 in layers with a garden hose followed by coarse mixing; at the time of testing, most pods were wet to the touch. "Wet Test 2" simulated similar moisture content to "Wet Test 1" but with a dry pod surface. It involved the same process as

|  |  | 2108 Combine | | | 2110 Combine | | |
|---|---|---|---|---|---|---|---|
| Dataset | Model Type | Optimum Angle, ° | Avg. Abs. Error, % | $R^2$ | Optimum Angle, ° | Avg. Abs. Error, % | $R^2$ |
| All Loads | Linear | 43 | 10.5 | 0.92 | — | — | — |
|  | $2^{nd}$ Order Poly. | 46 | 8.5 | 0.87 | — | — | — |
|  | $3^{rd}$ Order Poly. | 64 | 9.4 | 0.87 | — | — | — |
| Large Loads | Linear | 46 | 5.9 | 0.68 | 22 | 2.7 | 0.46 |
|  | $2^{nd}$ Order Poly. | 43 | 5.5 | 0.73 | 23 | 2.2 | 0.60 |
|  | $3^{rd}$ Order Poly. | 41 | 5.7 | 0.72 | 22 | 2.2 | 0.60 |

Figure 25A:
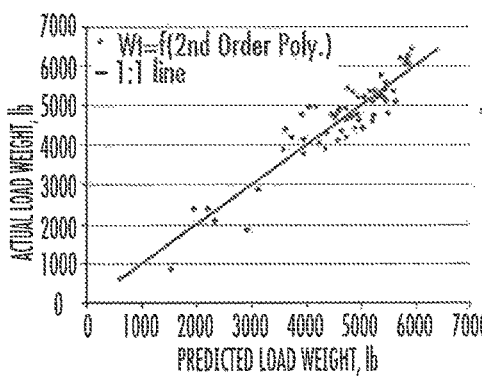
FIG. 25 presents actual load weight as a function of predicted load weight using $2^{nd}$ order polynomial models at optimal basket angles for: 2108 "all loads" (FIG. 25A) and 2110 "large loads" (FIG. 25B) datasets.
Figure 25B:
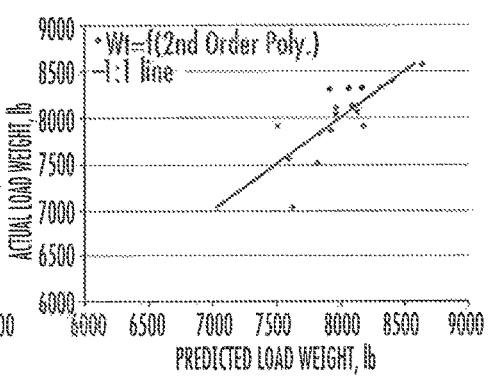

FIG. 25 shows actual load weight as a function of predicted load weight for the 2108 "all loads" (FIG. 25A) and 2110 "large loads" (FIG. 25B) datasets using $2^{nd}$ order polynomial regressions at the optimal basket angles as indicated in the table. More data, especially across a wider range of load weights could be collected on the 2110 combine to fully characterize its load weight prediction error. It is expected that load weight prediction error could "Wet Test 1" for wetting the peanuts, but the pods were allowed to soak in the moisture for about 45 minutes prior to testing. The dry state of the peanuts prior to moisture application allowed them to absorb the moisture readily; at the time of testing, most pods were dry to the touch. "Wet Test 3" simulated some surface moisture in addition to a thoroughly soaked kernel. Peanuts were fully submerged in water, soaked for two days, and then laid out in a thin layer to dry the majority of the surface moisture in the sun. Pods were slightly wet to the touch when tested, similar to the surface moisture imposed in "Wet Test 1".

Figure 26A:
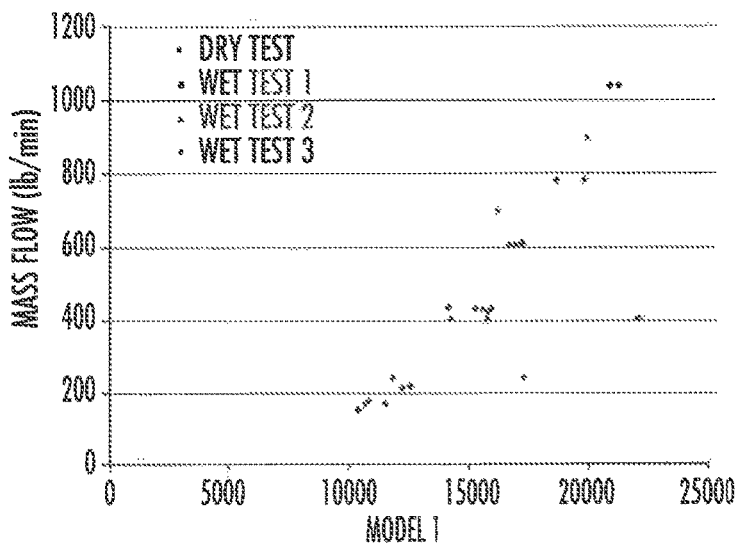
FIG. 26 presents peanut mass flow rate obtained comparing flow of wet peanuts to flow of dry peanuts using three different mass flow rate models (FIG. 26A, FIG. 26B, FIG. 26C).
Figure 26B:
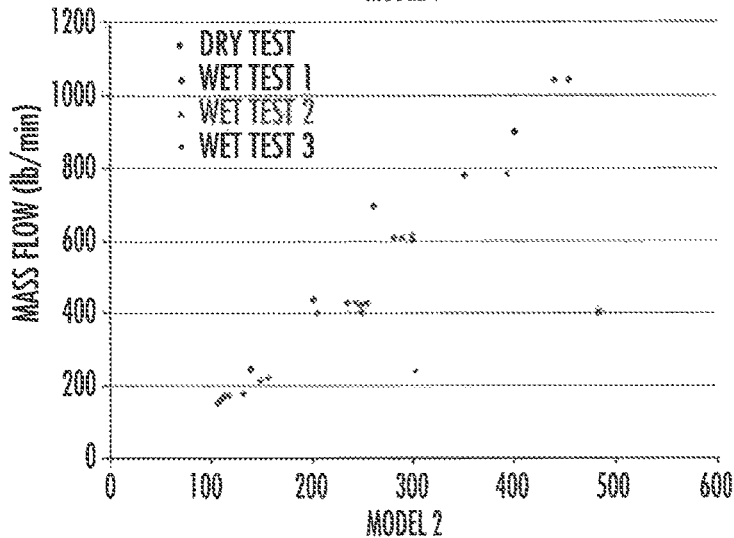
Figure 26C:
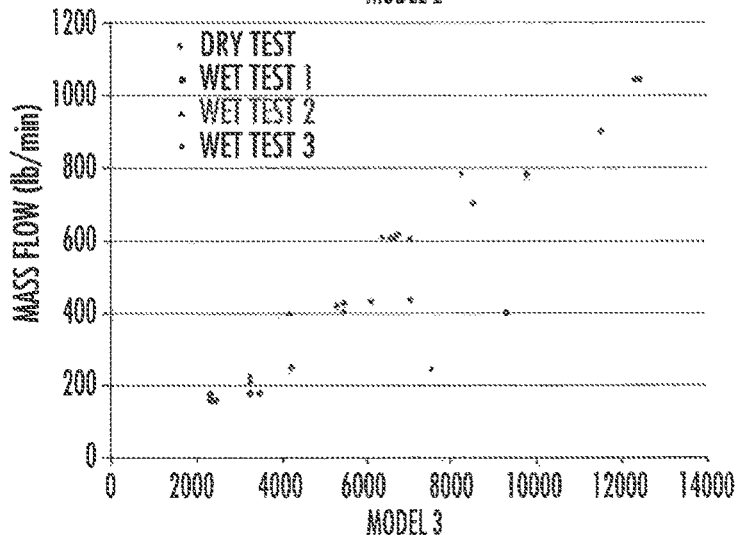
Figure 27A:
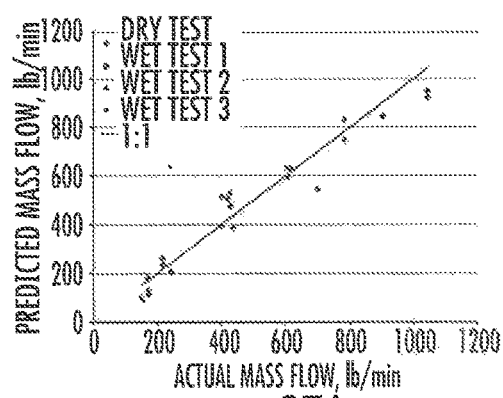
FIG. 27 graphically illustrates the predicted mass flow rate as a function of actual mass flow rate for stationary tests and demonstrates error of wet tests using four different mass flow rate models (FIG. 27A, FIG. 27B, FIG. 27C, FIG. 27D).
Figure 27B:
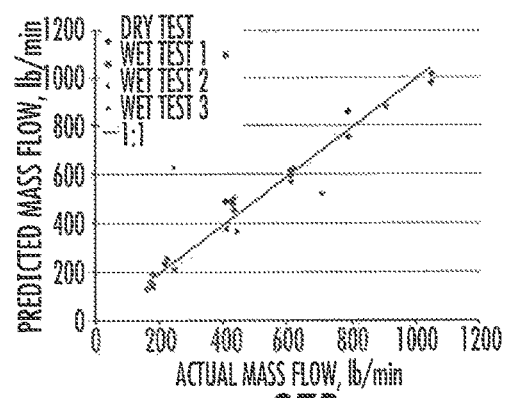
Figure 27C:
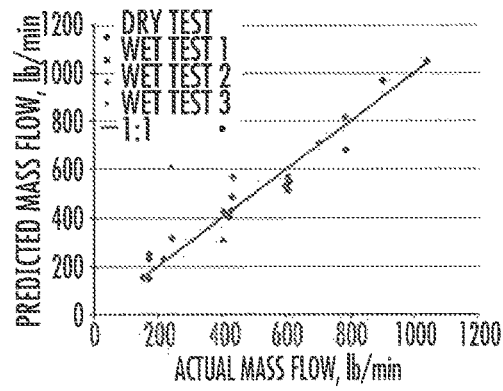
Figure 27D:
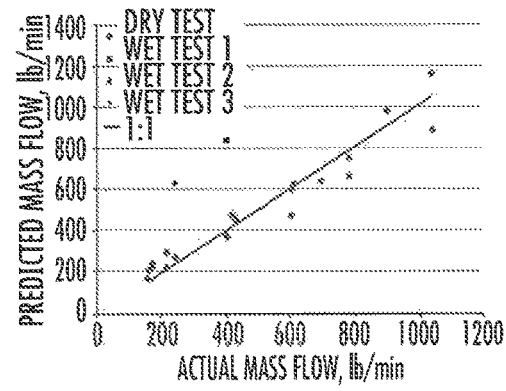

The results from the tests suggest that surface moisture can affect sensor response. The mass flow sensor response was presented as three different flow models (Model 1, Model 2, and Model 3) based upon different manipulations of the sensor response. As seen in FIG. 26, the pods with surface moisture in "Wet Test 1" and "Wet Test 2" had sensor responses suggestive of much higher mass flow rates than what was actually applied; mass flow rates demonstrated are dry mass flow rates. Pods with moisture applied but dry surfaces in "Wet Test 2", however, demonstrated similar sensor response as a function of dry mass flow rate. Because "Wet Test 1" and "Wet Test 2" had similar amounts of moisture applied, this is highly suggestive that the surface moisture affects mass flow sensor response. Furthermore, the magnitude of the effect on "Wet Test 1" (surface moisture only) and "Wet Test 3" (surface moisture and kernel moisture) is similar, suggesting that the additional kernel moisture in the pods from "Wet Test 3" had a lesser effect on sensor response than did the surface moisture on the same pods.

The table below provides moisture's effect on linearity of different models of the sensor response, with a comparison of coefficients of determination for linear regression models. The first row is for models applied across data from the dry tests only and the second row is for models applied across data from the dry and wet tests. The table shows that inclusion of wet test data had different impact on $R^2$ values depending on the sensor response model used.

| Tests Included | $R^2$ for Model 1 | $R^2$ for Model 2 | $R^2$ for Model 3 | $R^2$ for Model 4 |
|---|---|---|---|---|
| Dry Only | 0.939 | 0.956 | 0.954 | 0.987 |
| Dry and Wet | 0.713 | 0.698 | 0.820 | 0.953 |

FIG. 27 and the table below demonstrate error experienced in estimating mass flow of wetted peanuts using calibration coefficients developed for dry peanuts, FIG. 27 illustrates the predicted mass flow rate according to four different sensor response models (FIG. 27A, FIG. 27B, FIG. 27C, FIG. 27D) as a function of actual mass flow rate for stationary tests demonstrating error of wet tests. Calibration coefficients applied in FIG. 27 were for dry peanuts.

The table below provides the relative percent error for mass flow predictions of wet tests when applying dry test calibration coefficients across the models. Negative values represent under-predictions and positive values represent over-predictions.

| Test | % Error for Model 1 | % Error for Model 2 | % Error for Model 3 | % Error for Model 4 |
|---|---|---|---|---|
| Wet Test 1 | 150.7 | 172.3 | 93.2 | 107.9 |
| Wet Test 2 | 0.6 | −5.6 | −22.9 | −4.8 |
| Wet Test 3 | 169.2 | 162.4 | 155.4 | 161.7 |
| Average % Error | 107.8 | 113.4 | 90.5 | 91.5 |

Independent of sensor response model used, the peanut mass flow rates for "Wet Test 1" and "Wet Test 2" (with greater surface moisture) were over-predicted. When comparing the degree of over-prediction from "Wet Test 1" to that from "Wet Test 3", it can be seen that over-prediction is independent of model used, despite the higher kernel moisture contents for "Wet Test 3", further suggesting the importance of surface moisture as compared internal moisture. Further supporting this is the relative lack of error for "Wet Test 2", which had a similar moisture content as that in "Wet Test 1", but with a lack of surface moisture.

The tests confirmed that presence of surface moisture can lead to over-prediction independent of the sensor response model utilized and that correction for surface moisture, perhaps as an additional regressor, can help yield prediction error.

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A yield monitoring system for a harvesting machine comprising
    an impact plate attached adjacent a wall of a pneumatic crop conveyance duct, the impact plate including a first side and an opposite second side and defining a series of apertures therethrough passing from the first side to the opposite second side, the series of apertures having a size to allow air flow through the impact plate from the first side to the second side and to block crop flow through the impact plate; and
    a force sensor in mechanical communication with the impact plate.

2. The yield monitoring system of claim 1, wherein the impact plate is located at or near a bend of the duct.

3. The yield monitoring system of claim 1, further comprising an attachment bracket directly attaching the impact plate to the wall.

4. The yield monitoring system of claim 3, wherein the attachment bracket is on an upstream side of the impact plate, the remainder of the impact plate being physically separated from the wall.

5. The yield monitoring system of claim 3, wherein the attachment bracket is on a downstream side of the impact plate, the remainder of the impact plate being physically separated from the wall.

6. The yield monitoring system of claim 3, wherein the attachment bracket comprises a hinge mount.

7. The yield monitoring system of claim 1, wherein the impact plate is indirectly attached adjacent to the wall with no direct contact between the impact plate and the wall.

8. The yield monitoring system of claim 1, further comprising an optical sensor.

9. The yield monitoring system of claim 1, further comprising an air pressure sensor.

10. The yield monitoring system of claim 1, further comprising a moisture sensor.

11. The yield monitoring system of claim 1, wherein the force sensor is a load cell.

12. The yield monitoring system of claim 1, further comprising an unloading cylinder pressure sensor.

13. The yield monitoring system of claim 12, further comprising a container position sensor.

14. The yield monitoring system of claim 1, wherein the crop is peanuts.

15. A method for monitoring yield of a crop comprising:
connecting a force sensor to an impact plate such that the force sensor and the impact plate are in mechanical communication with one another, the impact plate including a first side and an opposite second side and defining a series of apertures therethrough passing from the first side to the opposite second side;
attaching the impact plate adjacent a wall of a pneumatic crop conveyance duct of a harvesting machine;
pneumatically conveying crop through the duct of the harvesting machine, wherein air passes through the apertures during the conveyance and crop is deflected off of the impact plate during the conveyance; and
monitoring the impact of the crop into the impact plate by use of the force sensor as the crop is conveyed through the duct to monitor yield of the crop.

16. The method of claim 15, further comprising connecting an optical sensor to the conveyance duct.

17. The method of claim 15, further comprising monitoring the air pressure of a pressure system that provides air to the crop conveyance duct.

18. The method of claim 15, further comprising monitoring the moisture content of the crop.

19. The method of claim 15, wherein the force sensor is a load cell.

20. The method of claim 15, further comprising removing the crop from the harvesting machine or from a field cart and monitoring the pressure of an unloading cylinder used in the removal to estimate the weight of the crop removed from the harvesting machine.

21. The method of claim 20, wherein the step of removing the crop from the harvesting machine or field cart comprises emptying a collection basket containing the crop into a crop transport vehicle, the method further comprising monitoring the location of the collection basket during the removal process.

22. The method of claim 20, the method further comprising comparing the estimate to weight limit requirements for a crop transport device.

23. The method of claim 20, further comprising utilizing the estimate to estimate the crop yield from a region of a field, from an entire field, or from a farm.

24. The method of claim 15, wherein the crop is peanuts.

* * * * *

UNITED STATES PATENT AND TRADEMARK OFFICE
CERTIFICATE OF CORRECTION

PATENT NO. : 9,958,301 B2  
APPLICATION NO. : 14/795323  
DATED : May 1, 2018  
INVENTOR(S) : Kendall R. Kirk et al.

Page 1 of 1

It is certified that error appears in the above-identified patent and that said Letters Patent is hereby corrected as shown below:

On the Title Page

(73) Assignee:
"Clemson University"
Should read:
"Clemson University Research Foundation"

Signed and Sealed this
Twenty-eighth Day of May, 2019

Andrei Iancu
*Director of the United States Patent and Trademark Office*